(12) United States Patent
Johan et al.

(10) Patent No.: US 11,222,523 B2
(45) Date of Patent: Jan. 11, 2022

(54) APPARATUS, SYSTEM, AND METHOD OF ESTABLISHING A COMMUNICATION LINK

(71) Applicant: Carrier Corporation, Farmington, CT (US)

(72) Inventors: Ron Johan, Queens Park (AU); Gabriel Daher, Long Point (AU); Daniel Ming On Wu, Chatswood (AU)

(73) Assignee: CARRIER CORPORATION, Palm Beach Gardens, FL (US)

(*) Notice: Subject to any disclaimer, the term of this patent is extended or adjusted under 35 U.S.C. 154(b) by 318 days.

(21) Appl. No.: 16/090,780

(22) PCT Filed: Mar. 29, 2017

(86) PCT No.: PCT/US2017/024762
§ 371 (c)(1),
(2) Date: Oct. 2, 2018

(87) PCT Pub. No.: WO2017/176527
PCT Pub. Date: Oct. 12, 2017

(65) Prior Publication Data
US 2020/0327797 A1 Oct. 15, 2020

Related U.S. Application Data

(60) Provisional application No. 62/318,299, filed on Apr. 5, 2016.

(51) Int. Cl.
*G08B 25/01* (2006.01)
*H04W 76/50* (2018.01)
(Continued)

(52) U.S. Cl.
CPC .......... *G08B 25/014* (2013.01); *G08B 25/10* (2013.01); *H04M 11/04* (2013.01); *H04W 76/50* (2018.02); *G08B 25/008* (2013.01)

(58) Field of Classification Search
CPC combination set(s) only.
See application file for complete search history.

(56) References Cited

U.S. PATENT DOCUMENTS 5,568,535 A  10/1996  Sheffer et al.
5,812,054 A   9/1998  Cohen
(Continued)

FOREIGN PATENT DOCUMENTS

EP   1113619 A2   7/2001
EP   2953106 A1  12/2015
(Continued)

OTHER PUBLICATIONS

3GPP, "3rd Generation Partnership Project; Technical Specification Group Services and System Aspects; Location Services (LCS); Service description; Stage 1", Release 11, downloaded by EPO: Sep. 22, 2012, XP-050649493, 50 pages.
(Continued)

*Primary Examiner* — Phung-Hoang J Nguyen
(74) *Attorney, Agent, or Firm* — Cantor Colburn LLP

(57) ABSTRACT

A method of establishing a communication path between a first terminal and a second terminal, the method including receiving a first call from the first terminal; answering the first call; generating a call establishment request (CER); establishing a second call to the second terminal; forwarding the CER to the second terminal; receiving an acknowledgement from the second terminal; and connecting the first call and the second call.

14 Claims, 13 Drawing Sheets

(51) Int. Cl.
  G08B 25/10 (2006.01)
  H04M 11/04 (2006.01)
  G08B 25/00 (2006.01)

(56) References Cited

U.S. PATENT DOCUMENTS

| | | |
|---|---|---|
| 6,741,171 B2 | 5/2004 | Palka et al. |
| 7,158,026 B2 | 1/2007 | Feldkamp et al. |
| 7,245,703 B2 | 7/2007 | Elliot et al. |
| 7,843,322 B2 | 11/2010 | Zakrewski et al. |
| 7,853,199 B2 | 12/2010 | Blum |
| 7,853,200 B2 | 12/2010 | Blum et al. |
| 8,248,226 B2 | 8/2012 | Friar |
| 8,385,511 B2 | 2/2013 | Glass et al. |
| 8,396,446 B2 | 3/2013 | Frenette et al. |
| 8,456,299 B2 | 6/2013 | Foisy et al. |
| 8,565,125 B2 | 10/2013 | Blum et al. |
| 8,705,704 B2 | 4/2014 | Smith et al. |
| 8,798,260 B2 | 8/2014 | Smith et al. |
| 8,976,937 B2 | 3/2015 | Shapiro et al. |
| 9,177,464 B2 | 11/2015 | Gregory |
| 2004/0086093 A1 | 5/2004 | Schranz |
| 2005/0083916 A1 | 4/2005 | Itagaki et al. |
| 2011/0028116 A1 | 2/2011 | Blum et al. |
| 2012/0058747 A1 | 3/2012 | Yiannios et al. |
| 2012/0121073 A1 | 5/2012 | Glass et al. |
| 2012/0139718 A1 | 6/2012 | Foisy et al. |
| 2012/0250833 A1 | 10/2012 | Smith et al. |
| 2012/0250834 A1 | 10/2012 | Smith et al. |
| 2013/0189943 A1 | 7/2013 | Bear |
| 2015/0161880 A1 | 6/2015 | Hwang et al. |
| 2015/0187368 A1* | 7/2015 | Kita .................. G10L 13/00 386/285 |
| 2016/0050311 A1* | 2/2016 | Goldstein .......... H04M 3/42051 455/566 |
| 2017/0256257 A1* | 9/2017 | Froelich .................. G10L 15/02 |

FOREIGN PATENT DOCUMENTS

| | | |
|---|---|---|
| WO | 2015013756 A1 | 2/2015 |
| WO | 2016085727 A1 | 6/2016 |

OTHER PUBLICATIONS

Barker, Greg, "ADT Home Security Audio Verification with Two-Way Voice Communication", California Security Pro, Mar. 10, 2011, 5 pages.
Central Station Alarm Association (CSAA), "Audio Verification and Notification Procedures", Oct. 31, 2007, 12 pages.
DSC (Digital Security Controls), "PowerSeries Neo—Alarm Verification Solutions" available at: http://www.dsc.com/dsc-product-families/neo/alarm-verification-solutions/4, accessed: Oct. 2, 2018, 2 pages.
International Search Report and Written Opinion for application PCT/US2017/024762, dated Jun. 19, 2017, 17 pages.
European Office Action for application EP 17718180.7, dated Jul. 24, 2019, 57 pages.
European Search Report for Application No. 17718180.7; dated Jun. 17, 2020; 13 Pages.
Zhuang Weiyin et al.; "Design and Inplementation of SIP B2BUA server", 2013 International Conference on Anti-counterfeiting, Security and Identification (ASID), IEEE, Oct. 25, 2013 (Oct. 25, 2013), pp. 1-5, XP032599584, DOI: 10.1109/ICASID.2013.6825282 [retrieved on Jun. 3, 2014].

* cited by examiner

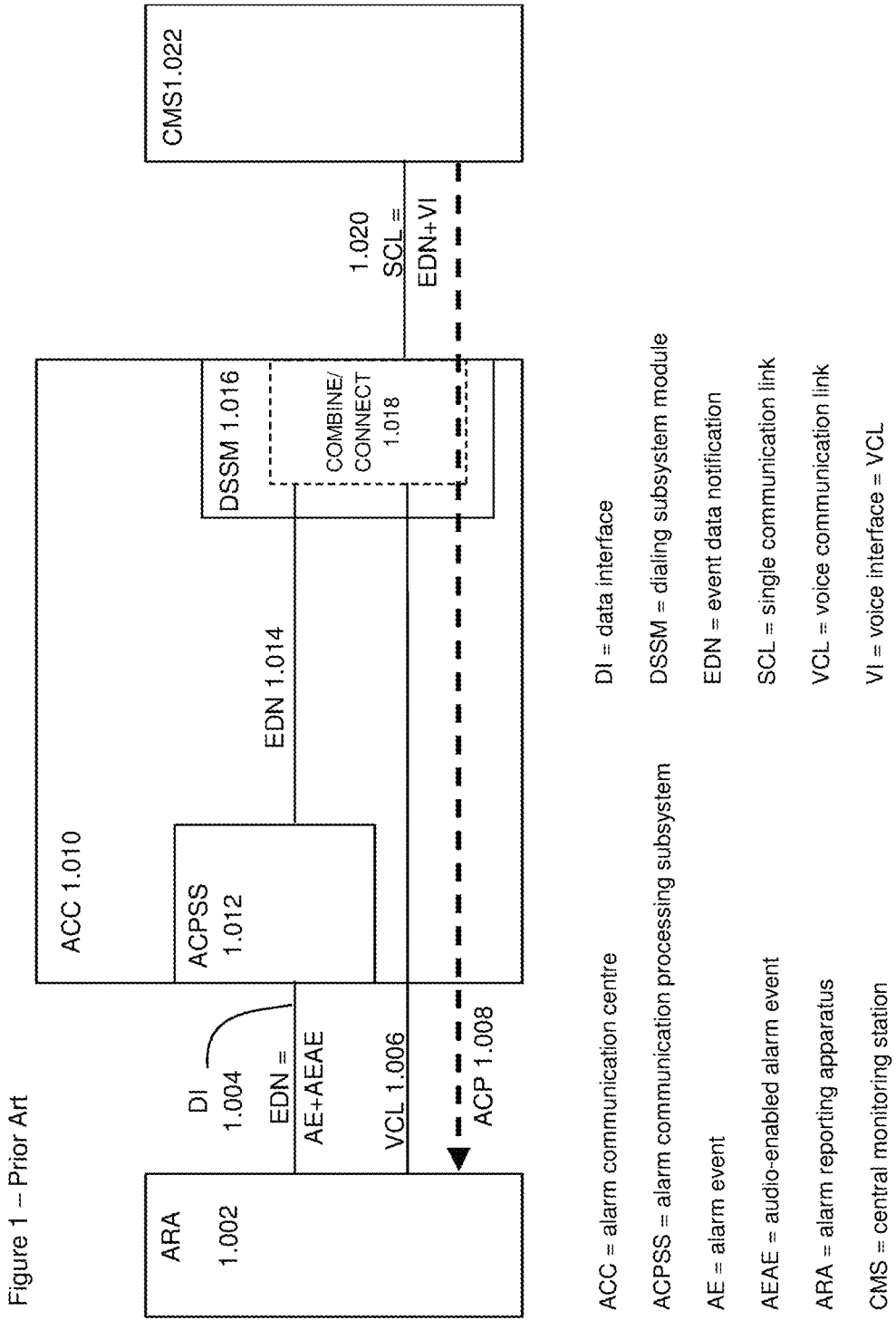

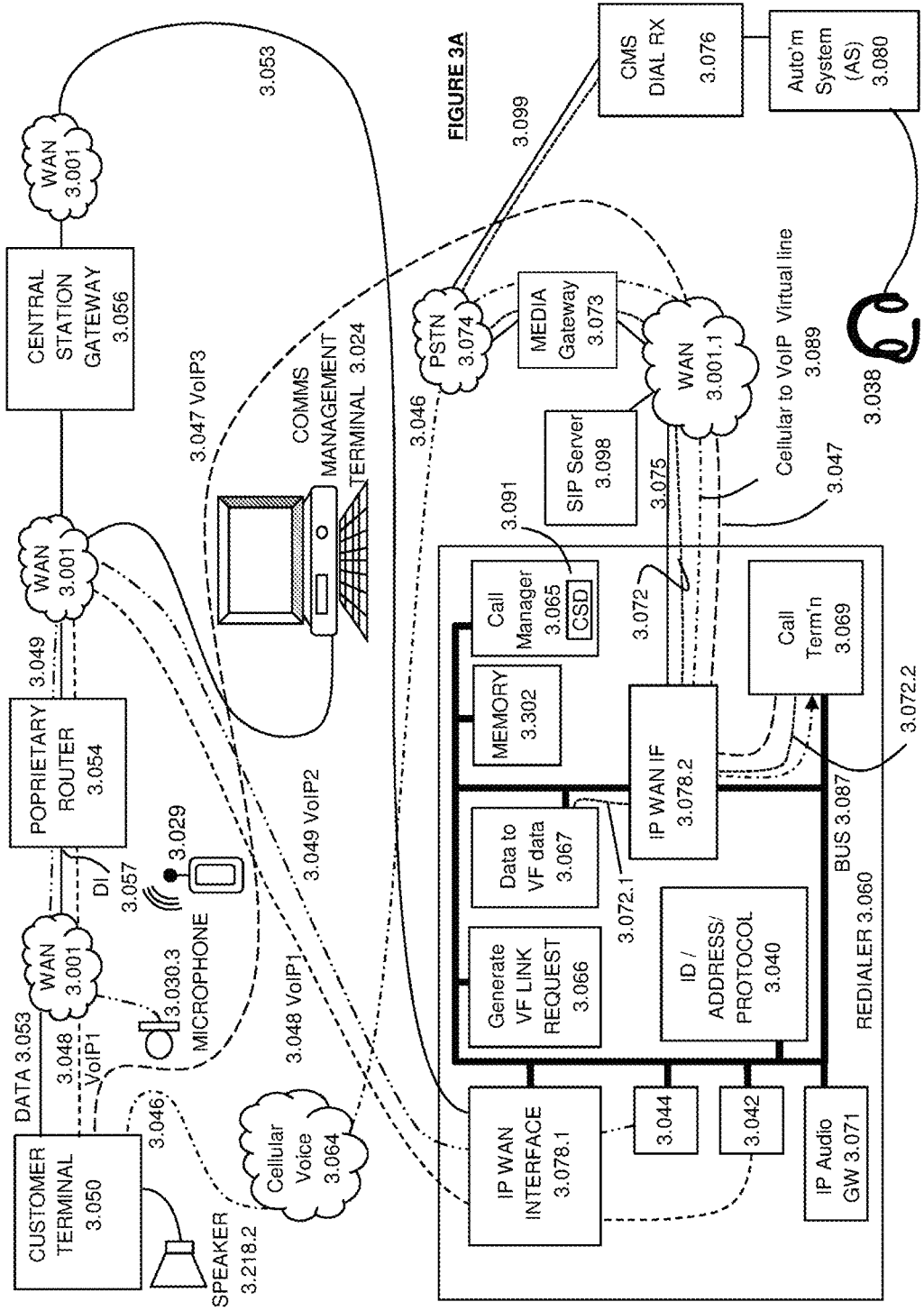

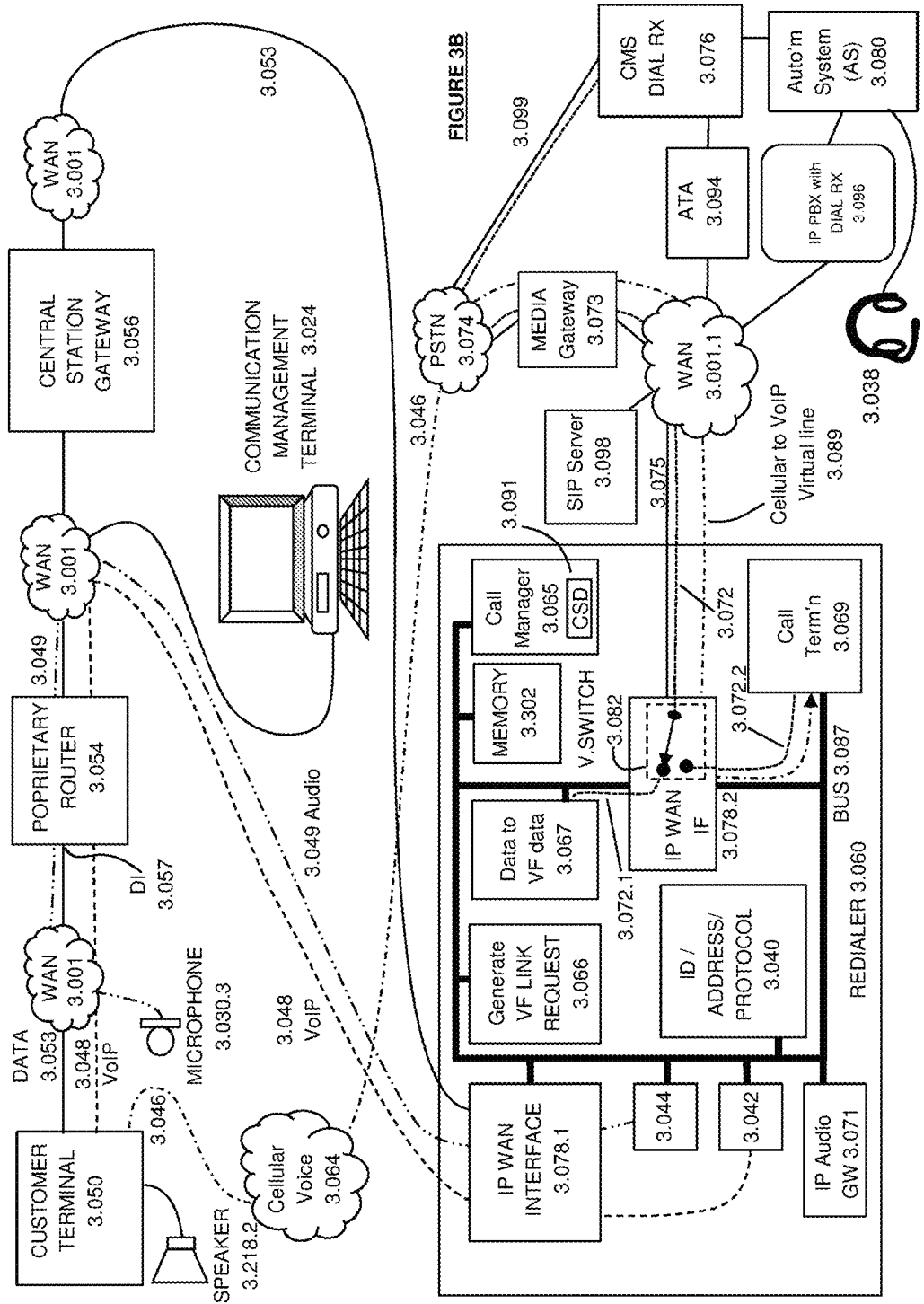

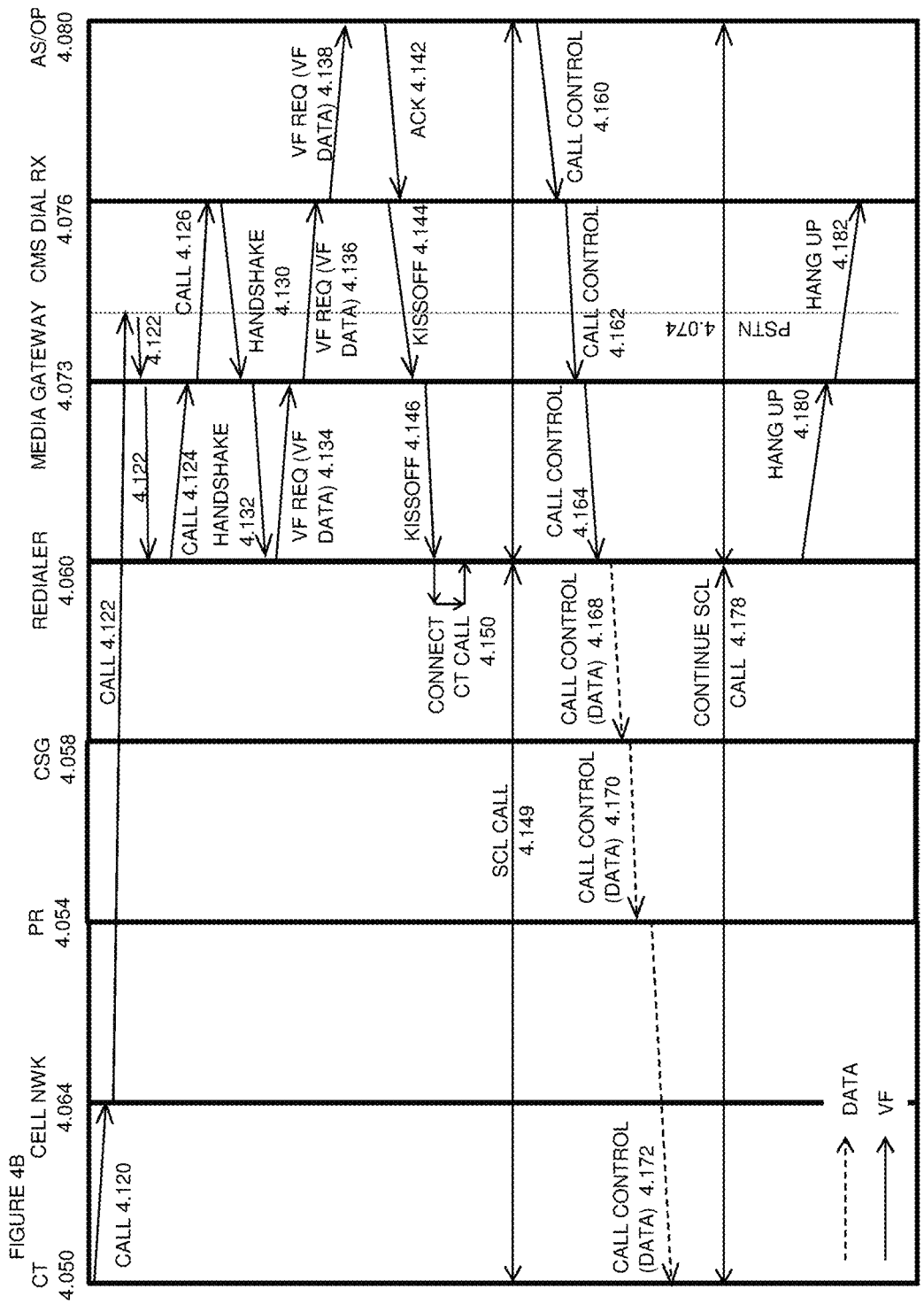

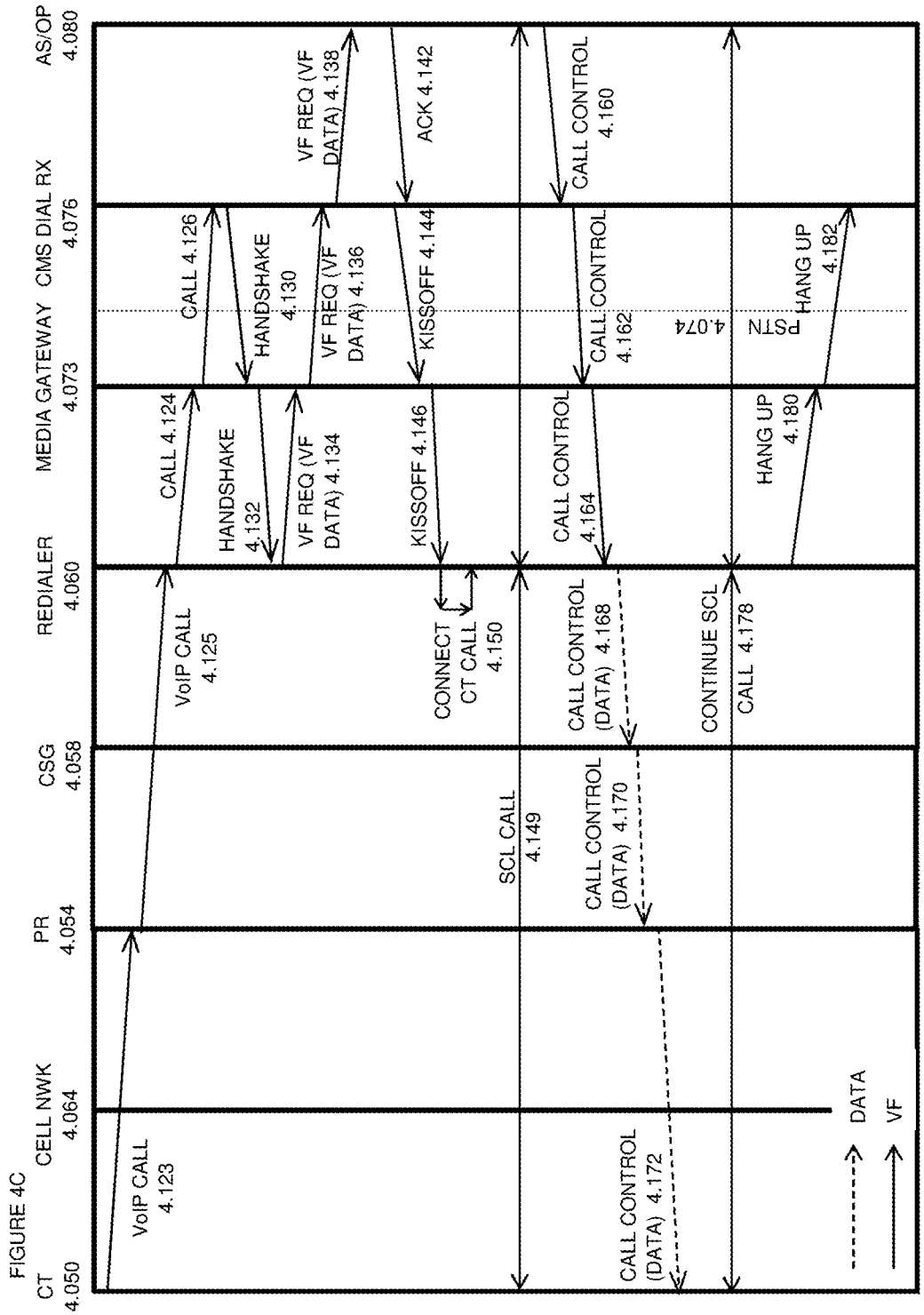

APPARATUS, SYSTEM, AND METHOD OF ESTABLISHING A COMMUNICATION LINK

BACKGROUND

Embodiments relate to the field of signaling and can be utilized in the field of security systems.

In this specification, the terms "audio call" or "audio communication" includes VoIP calls, cellular calls and the like.

Contemporary alarm systems can be designed to utilize data communication networks, such as wireless or wired wide area networks and can be adapted to use fixed line, for example ADSL or cable, or wireless links. A problem with alarm systems which are remotely monitored by central monitoring stations (CMS) and can set off a notification to the CMS when an alarm event is detected by an alarm system sensor is that the alarm sensor may be set off by a false alarm event.

One proposal to mitigate problems with false alarms is to provide a VF link between a human operator at the CMS and the alarm system at the premises allowing the operator to validate alarms by listening to sounds emanating from the monitored premises. However, the trend to utilize digital communications presents difficulties in setting up such a VF link.

Various solutions have been proposed to implement a system that supports a VF link between a human operator at the CMS (the terms operator and dispatcher are used interchangeably) and the alarm system at the premises which utilize digital communications, some of which have been listed below.

These systems suffer a number of drawbacks making them non-ideal in an environment that is increasingly moving to utilize digital communications, including:

Slow response times associated with many of the systems currently available such that often, after receiving an alarm notification from the monitored premises, the human operator at the CMS has to wait up to 180 seconds for the audio from the premises to be connected. This increases the chance that the intruder has moved away from the alarm system and can no longer be picked up by the microphone;

Complexity—a number of systems require the CMS to make significant changes to their equipment in order to receive a VF link from the monitored premises when digital communications are being utilized;

Future 'proof'—the currently available systems are not compatible with IP transmission systems and voice-over-IP peripherals.

Embodiments described herein address one or more of these and other issues.

U.S. Pat. No. 5,568,535 (Sheffer) describes an alarm system including a cellular telephone unit having a transceiver for receiving and transmitting wireless cellular telephone signals to a local cell site of a cellular telephone network, a signal processing unit linked to the transceiver and to at least one sensor for detecting unauthorized entry to the area and producing an alarm condition in response to detection of an unauthorized entry, the signal processing unit being set up to monitor the output from the or each sensor and to transmit an alarm signal to the transceiver on detection of an alarm condition, and the transceiver being programmed to establish a connection to a predetermined CMS via a local cell site on receiving the alarm signal, and to transmit a wireless emergency signal to the local cell site for transmission to the CMS on establishment of the connection. The system includes a "listen-in" capability whereby an operator at the CMS can either talk to a person at the alarm location or listen to voices or noises in the vicinity of the cellular telephone unit.

U.S. Pat. No. 8,385,511 (Telular) (see FIG. 1) discloses an alarm communication center (ACC 1.010) for establishing an audio communication pathway between an alarm reporting apparatus (ARA 1.002) and a CMS (1.022), in which the customer premises equipment (CPE) simultaneously sends both an alarm signal and a request to set up a VF link between the CPE and the alarm company monitoring station via a data network.

The Telular system includes an alarm communication center (ACC) comprising:

an alarm communication processing subsystem (ACPSS 1.012) being configured to establish a data interface (DI 1.004) to the alarm reporting apparatus (ARA) to receive an event data notification (EDN) from the alarm reporting apparatus (ARA), the event data notification (EDN) containing information on an alarm event (AE) and information on an audio-enabled alarm event (AEAE);

a dialing subsystem module (DSSM 1.016) being configured to receive a voice communication link (VCL 1.006) from the alarm reporting apparatus (ARA) and the dialing subsystem module (DSSM) being configured to receive the event data notification (EDN) from the alarm communication processing subsystem (ACPSS), wherein the dialing subsystem module (DSSM) being further configured to combine the event data notification (EDN) and the voice interface into a single communication link (SCL 1.020) capable of delivering data and audio; and the dialing subsystem module (DSSM) being further configured to connect the single communication link (SCL) to the CMS whereby the single communication link (SCL) delivers data and establishes an audio communication pathway (ACP 1.008) back to the alarm reporting apparatus (ARA).

In the system taught by U.S. Pat. No. 8,385,511 (Telular) the signaling of the AEAE to the CMS is independent of the actual presence of the audio connection to the alarm reporting apparatus and this may result in a delay to the establishment of the audio connection.

SUMMARY

The present disclosure provides an alternative means of providing a VF link between a CMS and a remote system when a trigger event is initiated at the remote system.

According to an embodiment, a redialer is adapted to receive a call from a first terminal, answer the first call and generate a call establishment request message (CERM), establish a second call to a second terminal and forward the CERM to the second terminal and connecting the first call and the second call after receiving an acknowledgement from the second terminal to the CERM.

According to an embodiment, there is provided a method of establishing a communication path between a first terminal and a second terminal, the method including:

receiving a first call from the first terminal;
answering the first call;
generating a call establishment request (CER);
establishing a second call to the second terminal;
forwarding the CER to the second terminal;
receiving an acknowledgement from the second terminal;
connecting the first call and the second call.

The method can include placing the first call on hold until the acknowledgement is received.

The first call can be in a first protocol and the second call can be in a second protocol, the method including converting the calls to an intermediate protocol before connecting the first and second calls.

The method can include the step of converting the second call in the intermediate protocol to the first protocol for transmission to the first terminal and converting the first call in the intermediate protocol to the second protocol for transmission to the second terminal.

The first and second protocols can be the same.

The method can include:

receiving VF message information using a first external protocol from either the first or second terminal;

converting the VF message information to a data message format;

and forwarding the message via an IP interface to the other of the first or second terminals.

The first terminal can be a mobile device having location capability, the method including sending a location message derived from the location capability to the second terminal.

According to an embodiment, there is provided a redialer adapted to receive a first call from a first terminal, answer the first call, generate a call establishment request, establish a second call to a second terminal, forward the call establishment request to a second terminal, and following receipt of an acknowledgement of the call establishment request, connect the first call and the second call.

The redialer can include:
at least one network interface;
a call manager processor (3.065);
a call detector (3.091);
call termination capability adapted to answer a first call (3.069);
a call establishment request generator (CERG);
wherein
the call manger processor is adapted to;
(a) cause a first call to be answered using the call termination capability;
(b) cause the CERG to generate a CER;
(c) establish a second call to a second terminal;
(c) forward the CER to a second terminal;
(d) receive a CER acknowledgement from a second terminal;
(e) connect the first and second calls.

The redialer can include at least one communication path interface adapted to receive calls in at least one external protocol and to convert the calls to a redialer internal protocol, and to convert outgoing calls from the redialer internal protocol to at least one of the external protocols.

The redialer can include at least two network interfaces wherein each interface is adapted to facilitate communications using different external protocols.

At least one of the network interfaces can be an IP network interface.

The redialer can include data message handling capability, whereby the redialer is adapted to receive VF message information using a first external protocol and to convert the to a data message format and forward the message via an IP interface.

The redialer can include a call termination, and wherein the first call is placed on hold on being answered.

The redialer can include a confidence tone generator adapted to play a confidence tone to the first terminal until the first and second calls are connected.

According to an embodiment, there is provided a communication system adapted to establish a communication path between a first terminal and a second terminal, the communication system including a redialer adapted to receive a call from the first terminal, answer the first call, generate a call establishment request, establish a second call to the second terminal, forward the call establishment request to the second terminal, and, on receipt of an acknowledgement of the call establishment request, connect the first call and the second call.

The first terminal can include a first communication interface adapted to establish a first communication path with the redialer via at least a first communication network (cellular 3.064);

The network can include a protocol converter adapted to convert calls between the incoming protocol and a second terminal protocol.

According to an embodiment, there is provided a mobile device including location capability, the mobile device being adapted to transmit, in response to user activation, a first message to a second terminal via a redialer, the mobile device being adapted to automatically transmit a location message to the redialer.

In one embodiment, the redialer is adapted to handle VF voice calls and VF data signals in a different manner.

DRAWINGS

Embodiments will be described with reference to the accompanying drawings, in which:

FIG. 1 shows a prior art system;

FIG. 3A illustrates a system incorporating embodiments;

FIG. 3B illustrates a system incorporating a further embodiment;

Figure 4A:
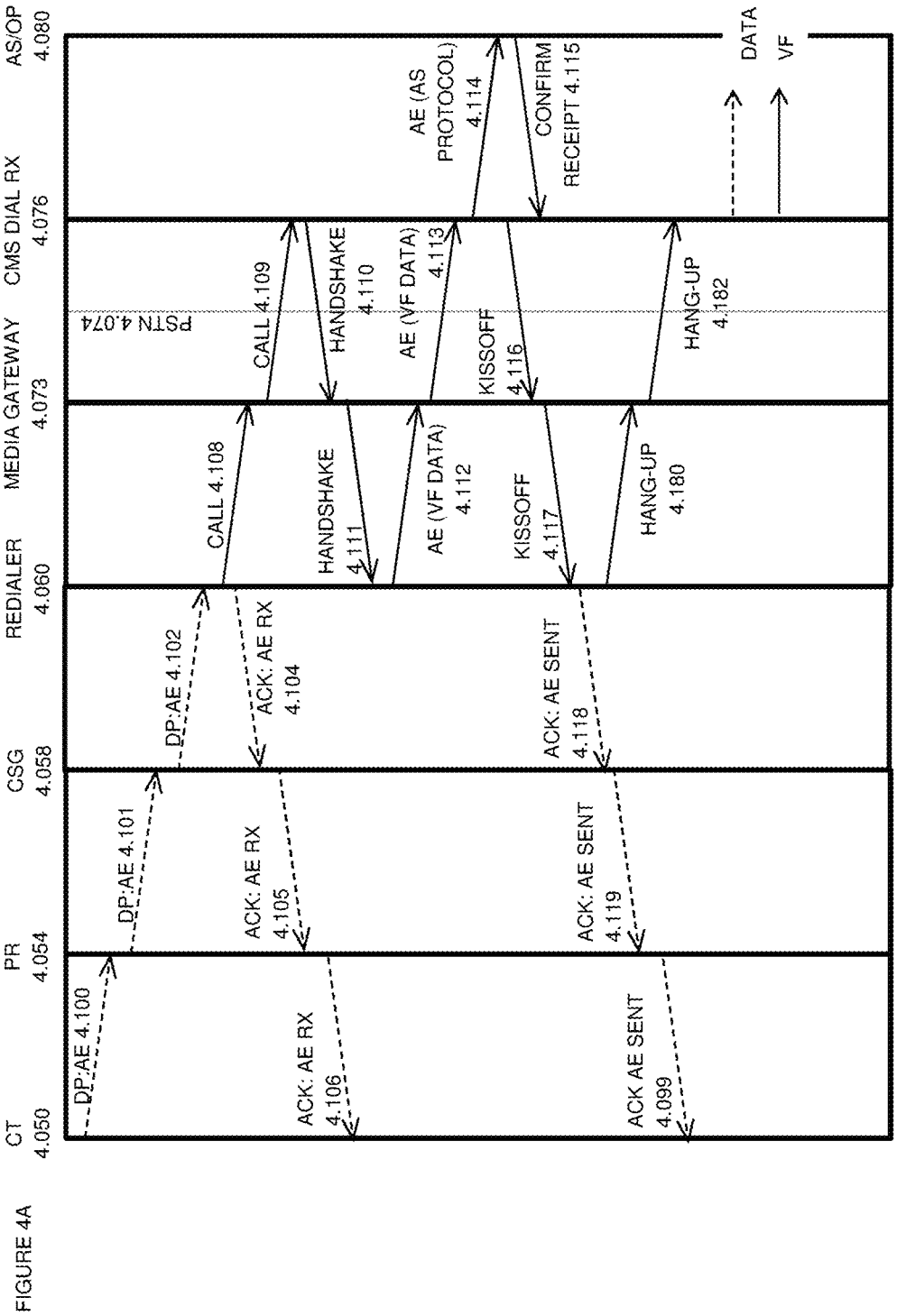
Figure 5:
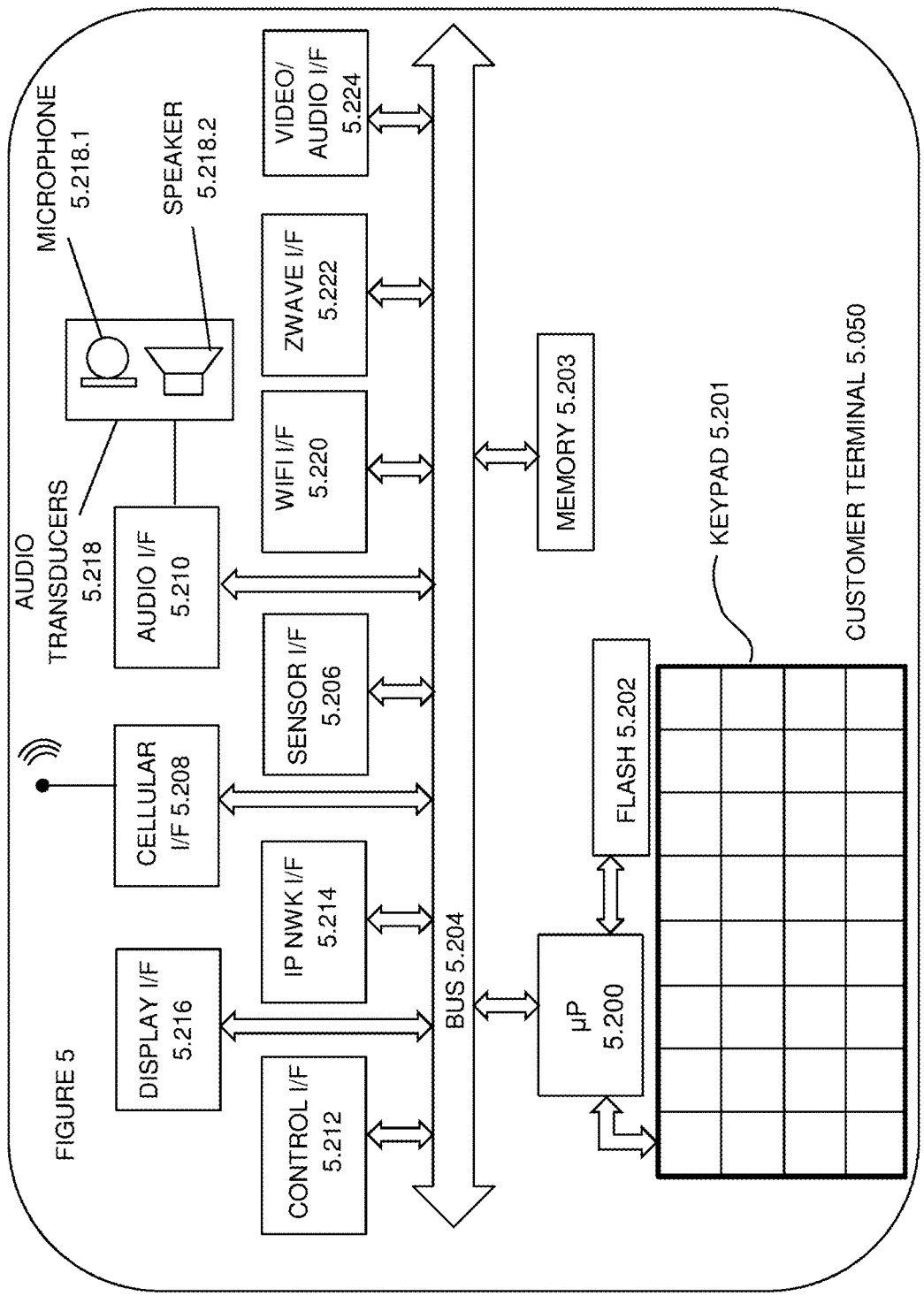
Figure 6:
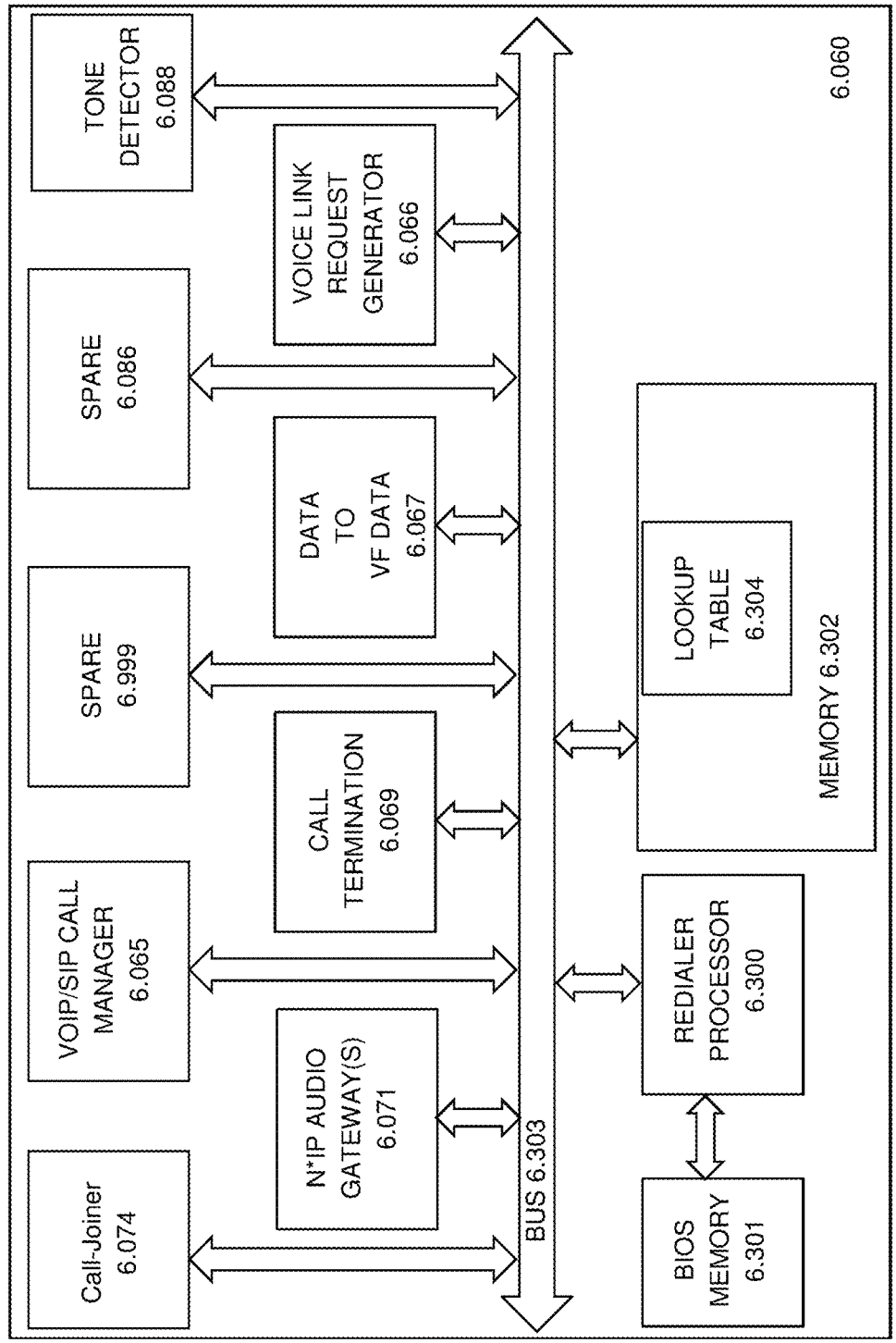
Figure 7:
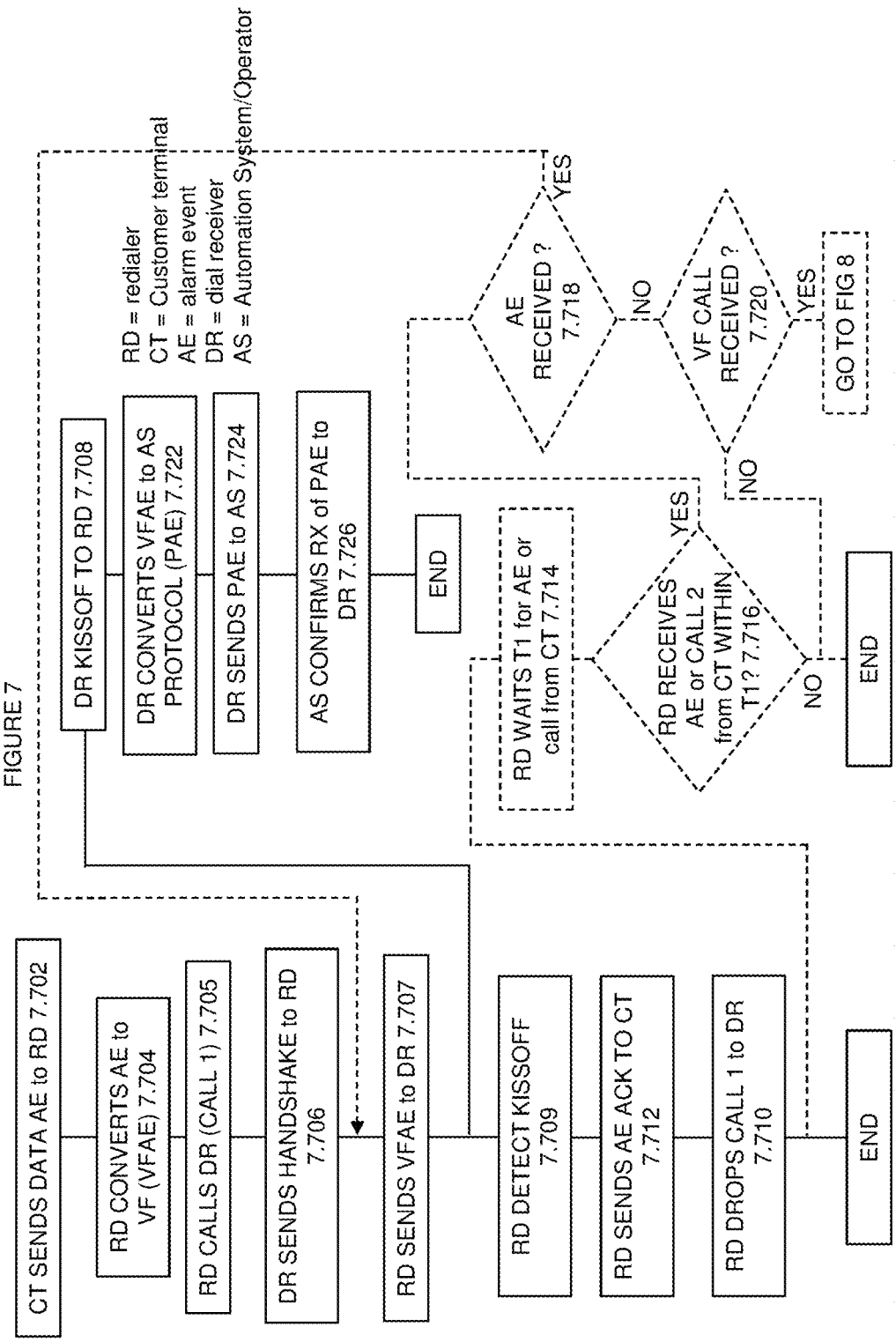
Figure 8:
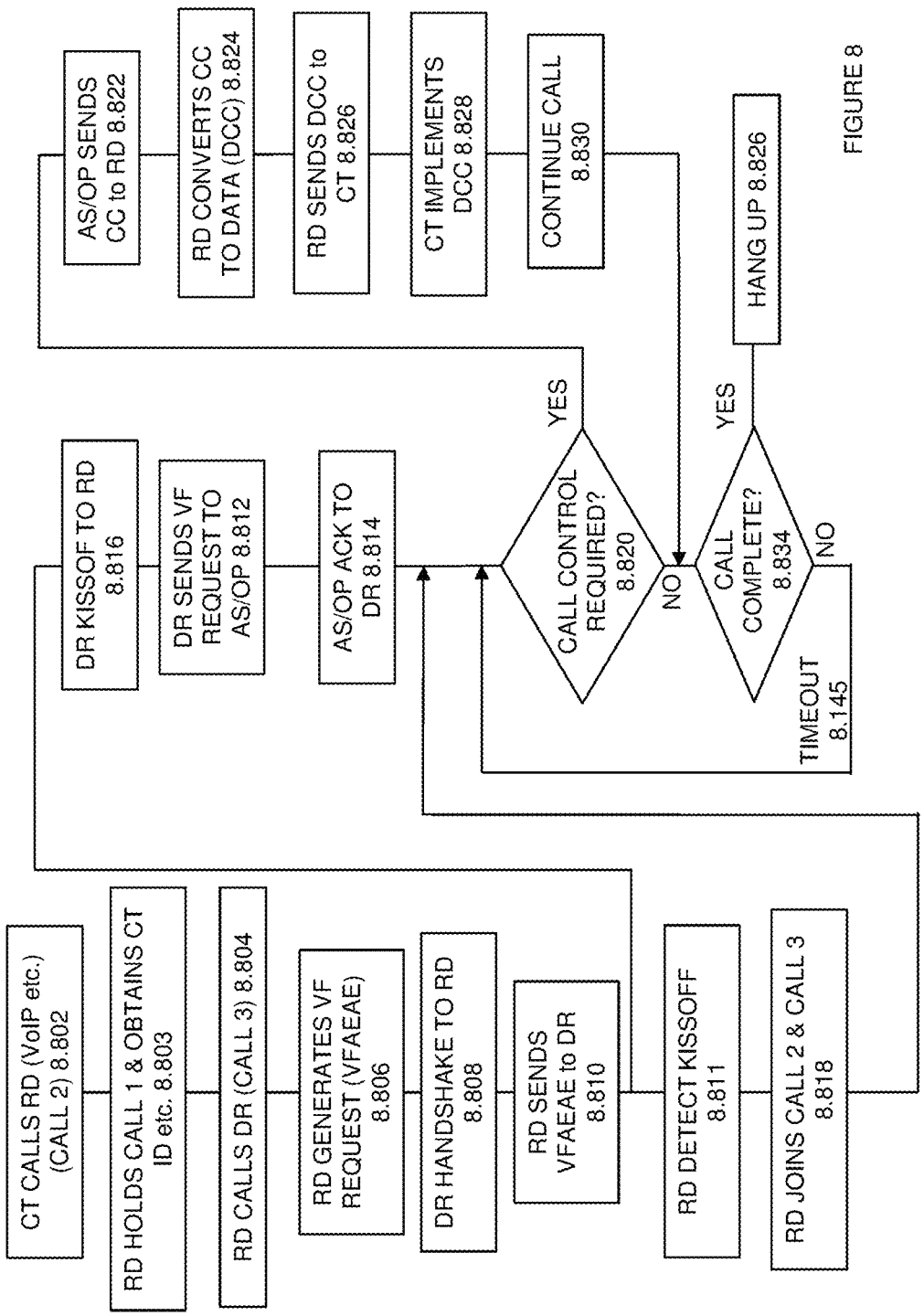

FIG. 4A details a flow diagram illustrating a method of alarm delivery to the CMS when no VF link is requested via the customer terminal;

FIG. 4B shows a flow diagram illustrating a method of establishing a cellular circuit-switched call based VF connection to the CMS according to an embodiment;

FIG. 4C shows a flow diagram illustrating a method of establishing an IP based VF connection to the CMS according to an embodiment;

FIG. 5 is a block schematic diagram illustrating functional features of a customer terminal according to an embodiment;

FIG. 6 is a block schematic diagram illustrating functional features of a redialer according to an embodiment;

FIG. 7 is a flow chart illustrating the steps associated with sending an alarm event from the customer terminal to the CMS;

FIG. 8 is a flow chart illustrating the steps associated with establishing a VF connection between the customer terminal and the CMS;

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "X.a" and a similar feature in FIG. Z may be labeled "Z.a." Although similar reference numbers may be used in a generic sense, various embodiments will be described and various features may include changes, alterations, modifications, etc. as will be appreciated by those of skill in the art, whether explicitly described or as otherwise would be appreciated by those of skill in the art.

DESCRIPTION

One or more embodiments described herein are directed to a method and/or system for routing signals and establishing calls to one or more CMS. The system may include one or more customer terminals.

Some embodiments utilize a proprietary router. A proprietary router is one which is accessible via a proprietary message from an associated edge device and which processes such proprietary messages in a predetermined manner. The proprietary router may be configured to connect specified terminals to associated terminals. The proprietary router may be adapted to terminate an incoming tunnel and establish an outgoing tunnel. An associated edge device may have access to a dedicated port of a proprietary router. Proprietary routers can be accessed via a public network.

In particular, the network can include one or more proprietary routers. A proprietary router can be adapted to be incorporated into a wide area network (WAN), while remaining under the control of a proprietor of a dedicated communication network, rather than being under the control of the WAN operator. The proprietary router can have proprietary interfaces adapted to communicate with associated terminals. The network can include one or more proprietary routers. A proprietary router is described in our patent application U.S. 62/083,538, the content of which is incorporated herein by reference. The present disclosure can be implemented by enhancing this proprietary router.

The redialer can be adapted to handle voice calls in a different manner from data messages. In particular voice calls can be connected to end-to-end (E2E) voice call path, while data messages can be connected to data paths, such as IP paths.

According to embodiments, listen-in, two-way voice, two-way audio or voice frequency (VF) communication can be established between a dispatcher at a CMS monitoring alarms from remote premises using an automation system (AS) and a customer terminal both in association with, and independently of whether an alarm event (AE) notification has first been sent from the customer terminal to be displayed at the AS.

The term SCN (Switched Circuit Network) can be used interchangeably to indicate circuit switched networks such as PSTN, ISDN, and cellular 2G, 3G etc. which are capable of carrying VF information in either analog (PSTN) or digital (ISDN, cellular), or hybrid data and analog (PSTN, ISDN) as distinct from packet switched digital networks such as the internet. The term PSTN will be used in the following description, but it will be apparent to the person skilled in the technology that other SCN networks could be used. The term VF data refers to digital data communications schemes that operate over VF communications links, such as the PSTN, to transmit data by using various tones such as VF modems, DTMF etc.

Figure 2A:
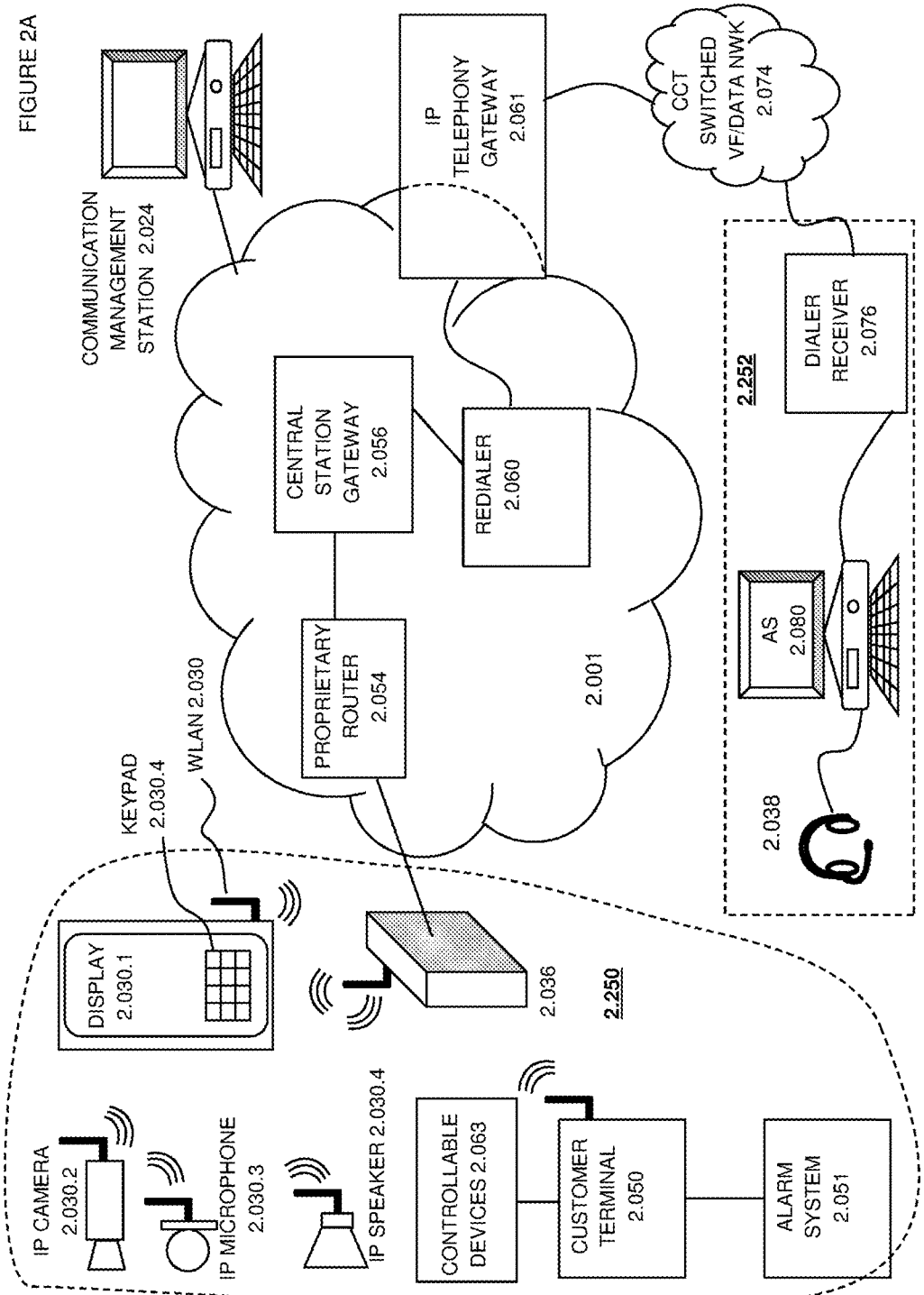
FIG. 2A illustrates a system according to an embodiment.

FIG. 2A shows a system according to an embodiment including:
wide area data network such as the internet 2.001;
communication system management station 2.024;
Wall or desk mounted graphical user interface device (2.030.1) with on-screen keypad (2.030.4) and WLAN connectivity (2.030);
WLAN connected IP camera 2.030.2;
WLAN connected IP microphone 2.030.3;
WLAN connected IP speaker 2.030.4;
WLAN/LAN/WAN gateway 2.036;
customer terminal 2.050;
alarm system 2.051;
central monitoring station—CMS 2.252;
proprietary router 2.054;
central station gateway 2.056;
redialer 2.060;
IP telephony gateway 2.061;
home automation controllable devices 2.063;
circuit switched (PSTN) VF/data network 2.074;
dialer receiver 2.076;
operator/dispatcher VF headset 2.038;
alarm company automation system (AS) 2.080.

FIG. 2A depicts a block diagram illustrating basic elements of the network architecture, including alarm delivery, network management and remote control according to one or more embodiments. The system is adapted to facilitate communication between a plurality of customer terminals 2.050 located at customer premises (2.250) and one or more alarm company AS 2.080. The communication can include alarm reporting, path supervision, remote control and the ability to establish an end-to-end (E2E) VF link between the customer terminal (2.050) and the CMS AS (2.080).

An alarm system (2.051) is in communication (wired or wireless) with customer terminal (2.050) which is in point-to-point communication with a network based proprietary router (2.054) to establish an E2E secure tunnel. The customer terminal may communicate with the proprietary router via a WAN gateway 2.036 at the premises 2.250. The customer terminal (2.050) may be an alarm and automation communicator, a broadband gateway (as shown in FIG. 2B), an alarm system, and may include a general device controller adapted to control controllable devices such as those shown at 2.063.

The customer terminal (2.050) may also have associated network devices such as IP microphones (2.030.3), IP cameras (2.030.2) and IP user interface device, such as a tablet (2.030.1). The network devices can be connected wirelessly to the local area network side of the gateway (2.036) and are provided with WAN (2.001) access via the gateway (2.036), or through an appropriately equipped customer terminal (2.050) as shown in FIG. 2B. Of course, the network devices can be connected to the gateway via (Ethernet) cable.

Figure 2B:
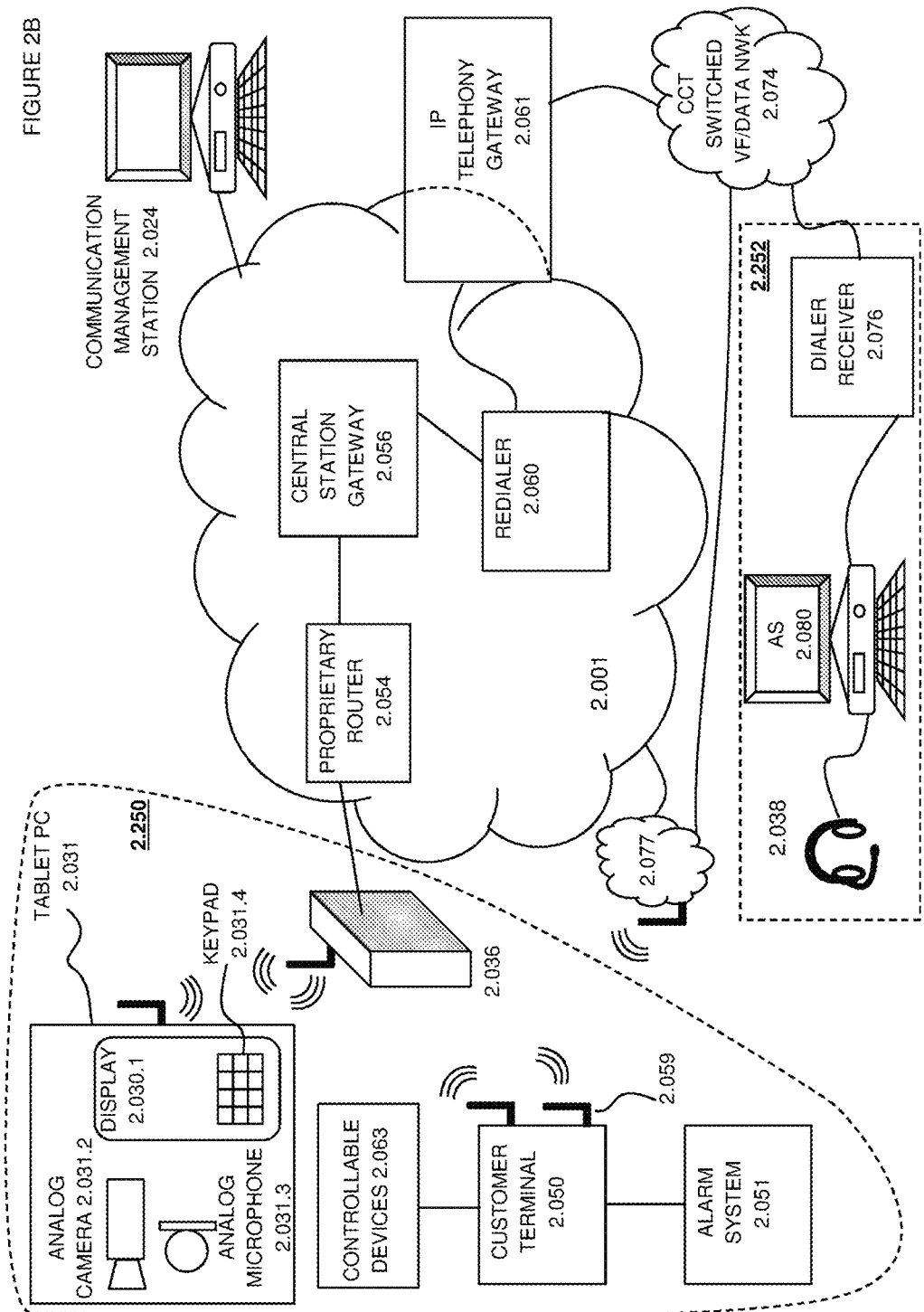
FIG. 2B illustrates a system according to another embodiment.

In an alternative embodiment shown in FIG. 2B, analog cameras (2.031.2) and analog microphones (2.031.3) can be used together with equipment providing analog-to-digital communication capabilities and communication capabilities (2.031) as shown in FIG. 2B. The analog microphone or speaker may be built into a device such as a tablet (2.031) or an analog to digital converter that is connected to the LAN (2.036).

In addition to providing audio monitoring functions, the tablet (2.031) can communicate with the customer terminal (2.050) via the gateway (2.036) so the tablet may also be used to provide a user interface to control various aspects of the premises, including the alarm system (2.051) and the controllable devices (2.063) and to provide a VF path to the CMS via an IP connection through the customer premises WAN gateway (2.036). While a wireless connection is shown between the network devices (2.030, 2.032 and 2.034), the customer terminal (2.050) and customer premises WAN gateway (2.036), it will be obvious to one skilled in the art that a wired network can also be supported.

Figure 2C:
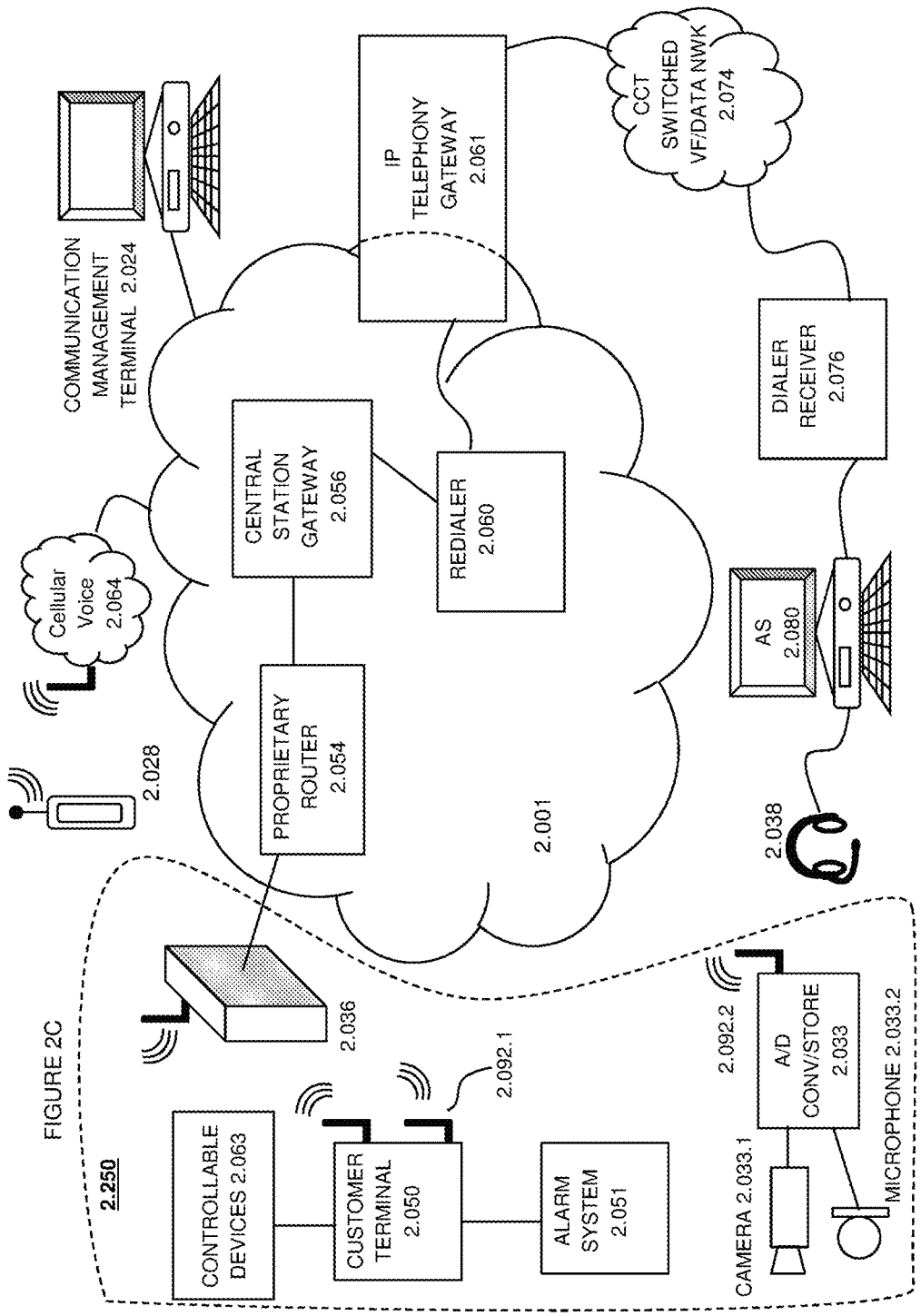
FIG. 2C illustrates a system according to a further embodiment.

FIG. 2C shows a further alternative embodiment in which an analog microphone (2.033.2) and analog camera (2.033.1) are connected to an analog-to-digital converter (2.033) which may also include video storage capability and communicates with the customer terminal, e.g., using WiFi (2.092.2).

The proprietary routers (2.054) can be dedicated routers such as the proprietary routers described in our co-pending patent application PCT/US15/061249. As well as performing normal router functions, these routers can provide dedicated communication connections between devices registered with the routers. A communication management station (2.024) can be provided to, among other functions, manage the configuration of the proprietary routers (2.054), the customer terminals (2.050), the central station gateways (2.056) and the redialer (2.060).

The customer terminal (2.050) can, for example, be adapted to control an alarm system (2.051) including one or more wired or wireless sensors installed at the premises. In addition, in some embodiments, the customer terminal (2.050) can be adapted to control a first home automation system installed at the premises and having controllable devices 2.063.

The system of FIG. 2A is adapted to enable the establishment of a voice frequency link between a customer terminal (2.050) and an AS (2.080). Such a voice frequency connection may be used, for example, to provide additional information to an operator at a CMS.

Customer terminal (2.050) is adapted to provide a communication interface for an alarm system (2.051). The customer terminal is in communication with a wide area network (2.001), such as the internet. The customer terminal is adapted to communicate with a proprietary router (2.054) with which the customer terminal has been associated during service provisioning. The proprietary router may be configured to associate the customer terminal (2.050) with a CMS (2.252) and its associated AS (2.080) for the notification of alarm events from the alarm system (2.051) associated with the customer terminal (2.050). The proprietary router (2.054) is adapted to forward messages from the customer terminal (2.050) to the CMS (2.252) via the central station gateway (2.056).

To ensure backwards compatibility with the majority of CMS', alarm event notification messages to the CMS AS (2.080) can be delivered using the public switched telephone network 2.074 (PSTN). Other methods such as IP messaging, as detailed in our various co-pending applications such as patent application PCT/US15/061249, are possible but are not standardized.

The alarm delivery process from the customer terminal (2.050) through to the CMS AS (2.080) is as follows:

On receipt of an alarm message from the alarm system 2.051, the customer terminal (2.050) uses its local area network interface to the WAN gateway (2.036) to send an alarm event to the proprietary router (2.054) through the internet (2.001) via a first encrypted IP tunnel established by the customer terminal (2.050) to the proprietary router (2.054);

The proprietary router (2.054) terminates the first encrypted tunnel and forwards the alarm event message to the central station gateway (2.056). The central station gateway (2.056) may use pre-configured information, such as an association table, to determine that the alarm event message is to be delivered to the associated CMS (2.252) via the PSTN (2.074) and routes the event message to the redialer (2.060). The redialer (2.060) uses the IP Telephony gateway (2.061) to place a PSTN call to the CMS (2.252). The call is answered by the dialer receiver (2.076) at the CMS (2.252). The redialer (2.060) delivers the message to the dialer receiver (2.076) using VF signaling such as DTMF, modem tones and the like. When the dialer receiver (2.076) has completed the reception of the alarm event message from the redialer (2.060), it sends an acknowledgement message to the redialer (2.060) and forwards the alarm event to the AS (2.080) to be presented to the dispatcher's terminal (2.080). The redialer (2.060) sends the acknowledgement message to the customer terminal (2.050) through the internet (2.001) via the central station gateway (2.056), the proprietary router (2.054) and the customer's broadband gateway (2.036).

In an alternative embodiment, discussed below with reference to FIG. 3B, the central station gateway (2.056) may determine that the alarm event message is to be delivered to the associated CMS (2.252) via IP.

Headset (2.038) is used by the dispatcher when handling a VF call from the monitored premises. From the redialer, calls to the dialer receiver that are associated with E2E VF connections can be preceded by an alarm event notification which can also serve to inform the dialer receiver (2.076) not to hang up the telephone call used to deliver the event. The AS (2.080) facilitates the connection of the alarm dispatcher's headset (2.038) to the call being held by the dialer receiver (2.076). Some CMS' (2.252) may choose to use a PBX to hold the call rather than a dialer receiver (2.076). A PBX can be used in conjunction with the dialer receiver if the dial receiver does not have integrated PBX capabilities.

FIG. 2B discloses a customer terminal (2.050) which is equipped with a cellular wireless interface (2.059) supporting communications over wide area wireless networks (2.077) such as 2G, 3G, 4G, LTE, 5G and the like. The wireless interface (2.059) allows the customer terminal (2.050) to communicate via the internet (2.001) with proprietary router (2.054) independently of the customer's broadband service delivered by gateway 2.036 or as an alternative to use the customer's broadband connection as a way to obtain communications path redundancy. The wireless interface (2.059) also supports the ability of the customer terminal to place cellular telephone calls to the redialer (2.060) via the cellular network (2.077) and the PSTN (2.074) or directly to the CMS dialer receiver (2.076) via the cellular network (2.077) and the PSTN (2.074) as a means of establishing E2E VF communications between the customer terminal (2.050) and the central station dispatcher's headset (2.038).

The cellular wireless interface (2.059) also allows the implementation of a wireless-only system, one that eliminates the need for the customer premises (2.250) to have a broadband service via a gateway (2.036). As part of this embodiment, customer terminal (2.050) is the broadband gateway for the associated network devices such as IP cameras (2.030.2), IP microphones (2.030.3) and tablet PCs (2.031).

Further embodiments will be discussed with reference to FIGS. 3A, 3B, 4B, and 4C. FIGS. 3A and 3B illustrate embodiments of an alarm reporting and the VF delivery system, FIG. 4A details the alarm delivery process where a VF link is not required to be established, and FIGS. 4B and 4C detail the establishment of the E2E VF path.

FIG. 3A shows three message paths emanating from the customer terminal 3.050, namely a data path 3.053 used for alarm signaling and management, a VoIP path 3.048, and a circuit-switched cellular path 3.046. In addition, in the case where the IP microphone 3.030.3 (which may be a component of an IP camera) is independent of the customer terminal (3.050), additional audio paths can connect the IP microphone to the proprietary router (3.054). Of course, the customer terminal can also have audio functionality, such as speaker (3.218.2) and microphone (not shown).

Redialer 3.060 includes IP WAN interface (3.078.1, 3.078.2), IP audio gateway (3.071) and associated interfaces (3.042, 3.044) which can be adapted to handle different IP call establishment protocols, VF link request generator (3.066), ID/address/protocol subsystem (3.040), data to VF data converter (3.067), call manager (3.065), call termination (3.069), call signaling/detector (3.091), and bus (3.087). The transmission of an AE can be separated from the setting up of an E2E VF connection as the setting up of an E2E VF connection is independent of any AE which may precede it. Note that, while two WAN interfaces (3.078.1 & 3.078.2) are shown in FIGS. 3A & 3B, these are both incorporated in a single WAN interface, and are shown as two items to reduce the complexity of the connections in the drawings. The setting up of the E2E VF connection can be implemented as a software task within the redialer application. The source of the data stream to be connected to the virtual phone line (3.072) are determined by the ID address protocol module (3.040) as is the telephone number of the associated CMS. The call manager (3.065) instructs the data-to-VF-data module (3.067) to route its data stream on to the WAN interface (3.078.2) and at the appropriate juncture, the call manager (3.065) instructs the data to VF data module (3.067) to stop sending data, that is, to disconnect. At a later stage, as determined by the requirements of the protocol, such as the duration of the kissoff signal, the call manager (3.065) instructs the call termination module (3.069) to route its data on to the WAN interface (3.078.2). For example, a data stream from the CT (3.050) is routed out on 3.072.

A first action discussed will be the initiation of alarm events (AE) notifications from the customer terminal (3.050) to the CMS AS (3.080) in order to notify the dispatcher of an AE. The customer terminal (3.050) delivers AEs on path 3.053 via an IP tunnel established by the customer terminal (3.050) to the proprietary router (3.054) over a wide area network interface, which could be an IP network to which the customer terminal is connected via wireline, wireless or both (for redundancy). The AE message travels through the WAN (3.001), which may be the internet, and is terminated on a proprietary router's (3.054) data interface (3.057). The proprietary router forwards the AE via the WAN (3.001) to the central station gateway (3.056). The central station gateway (3.056) determines which CMS will receive the AE and the interface to use for the AE delivery (IP, PSTN etc.). For the AE to be delivered to the CMS AS (3.080) over the PSTN (3.074), the central station gateway (3.056) routes the AE over the WAN (3.001) to the redialer (3.060). The redialer (3.060) receives the AE on its IP WAN interface (3.078.1). The IP WAN interface (3.078.1) places the AE, via the redialer bus (3.087) in the redialer's memory (3.302) and informs the call manager (3.065) that an AE is available in the memory (3.302). The call manager (3.065) returns an acknowledgement message to the CT (3.050) and initiates set-up of a PSTN call to the CMS dialer receiver (3.076).

A media gateway (3.073) connects the VoIP call to the PSTN (3.074) and implements the digital to analog conversion in the direction to the PSTN and the analog to digital conversion in the direction to the IP WAN (3.001.1). The call manager (3.065) also directs the data-to-VF-data subsystem (3.067) to convert the AE message to a form which is compatible with the PSTN, such as ContactID or SIA which use DTMF or low-speed VF modem signaling schemes respectively.

The call manager (3.065) informs the data-to-VF-data subsystem (3.067) of the AE in the redialer's memory (3.302). The data-to-VF-data subsystem (3.067) proceeds to generate a waveform as a set of numerical values stored in the redialer memory (3.302) representing the sampled analog waveform used to represent the AE which will appear on the dialer receiver's (3.076) PSTN interface. Thus at the time determined by the call manager (3.065) the binary encoded samples generated in the data-to-VF-data subsystem (3.067) and stored in the redialer memory (3.302) are streamed via WAN interface 3.078.2 to the IP link (3.072) through the media gateway (3.073) and into the PSTN (3.074) where the resultant analog waveform is received by the dialer receiver (3.076) and interpreted as the AE message.

After detecting the handshake tones from the dialer receiver (3.076), the call manger (3.065) signals to the data-to-VF-data subsystem (3.067) to output the AE sample data stream using the VF signaling format such as ContactID or SIA (Security Industry Association defined protocol) on to the virtual telephone line (3.072) via WAN interface (3.078.2). The call manager (3.065) then listens for the acknowledgement tone (also known as kissoff) to be sent by the dialer receiver (3.076). If the kissoff tone is not received from the dialer receiver (3.076), the AE sample data stream is re-sent until the kissoff tone is received or a predetermined number of re-tries has been exhausted. If after the kissoff tone has been received and there are no further alarm event messages to send to the dialer receiver, the call manager (3.065) hangs up the call as does the dialer receiver (3.076).

Some AEs are associated with the setting up of an E2E voice circuit as a stand-alone action or in conjunction with an AE. This provides a means for a person at the monitored premises to rapidly establish communications with the alarm dispatcher during an emergency or to provide a means for the CMS dispatcher to verify an alarm report.

FIG. 3A illustrates a number of ways in which embodiments supports the setting up of a two-way voice circuit. Three will be described, however one skilled in the art will immediately realize the various permutations that can be used. It should be noted that the same method can be used to provide listen-in functionality in which the dispatcher is able to receive VF information from the customer terminal, but does not have VF transmission capability to the customer terminal.

In one such embodiment, the customer terminal utilizes a cellular phone call. When the customer terminal (3.050) has determined that an E2E voice circuit is required, it uses its cellular voice interface (3.046) to place a cellular circuit-switched call via the cellular network (3.064) to the redialer (3.060). The call can include caller ID information or as an alternative embodiment after the call is answered by the redialer (3.060) the customer terminal (3.050) may send its identification to the redialer (3.060) in a VF encoded signal such as DTMF.

The call reaches the redialer via the PSTN (3.074) and connects to the redialer as a VoIP call via the media gateway (3.073) over a virtual circuit (3.089). The media gateway (3.073) acts as an interface between the analog PSTN (3.074) and the WAN (3.001.1). It informs the SIP server (3.098) of the incoming call from the PSTN (3.074).

The call manager (3.065) is notified of the incoming call via call signaling detector (3.091) which obtains the call signaling information from incorporated in the incoming message from the SIP server (3.098) and conveys the originating customer terminal's caller ID to the call manager (3.065). The call manager (3.065) instructs the call termination module (3.069) to answer (terminate) the call and place it on hold.

The call manager (3.065) stores the incoming call's caller ID information in the redialer's memory (3.302) and sends it to module 3.066 (Generate VF Link Request) which uses the caller ID details to identify the customer terminal (3.050) which placed the call, retrieve its details from a common storage module (3.040).

The storage model (3.040) can be accessed via a gateway to an external database. The storage module (3.040) can include CMS phone number, customer account number and security format to use (e.g. ContactID, SIA or other) and the generate VF link request module (3.066) proceeds to synthesize one or more special alarm events to use to signal to the CMS via its AS (3.080) that said customer terminal is looking to establish a two-way voice circuit with the CMS—referred to as an audio enabled alarm event (AEAE). Module 3.066 (Generate-VF-Link-Request) stores the synthesized AEAE in the redialer's memory (3.302) and notifies the call manager (3.065) that an AEAE is available for it in the redialer's memory (3.302). The call manager (3.065) informs module 3.067 (Data to VF data) that it needs to process the AEAE in the redialer's memory (3.302) which proceeds to generate the data samples used to deliver the AEAE to the CMS and stores the data samples in the redialer's memory (3.302).

The call manager (3.065) dials up the CMS to deliver the AEAE to the CMS dialer receiver (3.076) as described above, over the outgoing VoIP line (3.072) via WAN interface (3.078.2), WAN (3.001.1), media gateway (3.073), and PSTN 3.074. In the exemplary embodiment shown in FIGS. 3A & 3B, all redialer internal communications are passed over the bus (3.087). However, alternative layouts may be used within the inventive concept.

After receiving the AEAE, the dialer receiver (3.076) at the CMS sends kissoff tone to the redialer (3.060), notifies the AS (3.080) and places the call on hold. The AS (3.080) identifies to the dispatcher that an E2E VF circuit is available and the dispatcher can trigger the AS (3.080) to connect the audio to the dispatcher's headset (3.080).

When the call manager (3.065) receives the kissoff tone for the AEAE from the dialer receiver (3.076) at the CMS, it does not hang-up the call as when delivering an AE. Instead the previously parked call on link 3.046 from the customer terminal (3.050) can be connected through to the CMS.

Bus (3.087) is an inter-process messaging bus. It is used by the various software processes of the redialer (3.060) described above to communicate and transfer data. The WAN interface (3.078.2) is adapted to convert inputs from bus (3.087) into IP format onto line 3.075. Thus the AEAE or the AE messages sent on line 3.072.1 in VoIP format for transmission to the CMS (2.252) and are converted by the WAN interface (3.078.2) to Ethernet format for transmission over the WAN (3.001.1).

Similarly, incoming VoIP messages are converted to the redialer's internal protocol.

The incoming cellular call (3.046) from the customer terminal (3.050) is announced by the SIP server (3.098) sending a message over the WAN (3.001.1) to the redialer (3.060). The SIP message is received by the redialer's WAN interface (3.078.2) and is forwarded on the bus (3.087) to the call manager (3.065). The call signaling detector (CSD) task (3.091) in the call manager (3.065) informs the call manager (3.065) of the incoming call and extracts the caller ID information from the call. The call manager stores the caller ID information in the memory (3.302) and instructs the call termination module (3.069) to answer the call. The call termination module (3.069) may at this stage stream a data file from the memory (3.302) to send ring tone or an announcement to the customer terminal (3.050), which the customer terminal (3.050) may connect to its speaker, via the IP WAN interface 3.078.1 or 3.078.2 depending on the signaling protocol used to establish the call from the customer terminal (3.050). The call manager (3.065) informs the generate-VF-link-request task (3.066) to synthesize the audio enabled alarm event (AEAE) message to send to the CMS.

In FIG. 3, data stream 3.072.1 contains the AEAE VF samples and data stream 3.072.2 which is the data stream associated with the cellular call from the customer terminal. The WAN interface (3.078.2) acts as the switch passing one stream first—that is joining 3.072.1 with 3.072 and then joining stream 3.072.2 with 3.072. All these are carried on one virtual circuit—VoIP call over an Ethernet connection (3.075) to the WAN (3.001.1).

The resultant E2E VF path comprises following:
the customer terminal (3.050)
phone call (3.046)
the cellular telephone network (3.064)
the PSTN (3.074)
the media gateway (3.073)
the WAN (3.001.1)
a VoIP line (3.089)
WAN interface (3.078.2)
the call termination module in the redialer (3.069)
WAN interface (3.078.2)
the redialer outgoing VoIP line (3.072)
the WAN (3.001.1), which may be the same as WAN 3.001
the media gateway (3.073)
the PSTN (3.074)
the dialer receiver (3.076)
the dispatcher's headset (3.038).

In one embodiment, the redialer is adapted to handle VF voice calls and VF data signals in a different manner. The data signals can be processed from the WAN IF (3.078.2) via data-to-VF data capability (3.067) and IP WAN interface (3.078.1). The signal processing modules of the redialer (3.060), such as data-to-VF data capability (3.067), call termination (3.089), and gateway (3.071) and interfaces (3.078.1), (3.078.2), (3.044), (3.042), are bi-directional.

A person skilled in the art will understand that the virtual link 3.089 and the SCL 3.072 can be carried on the same physical link in the same manner as one or more bidirectional VoIP calls can be carried on a single physical link.

It should be noted that embodiments support various implementations of the AEAE and VF call termination at the CMS. For example some dialer receivers may support call switching functionality while others may use an external PBX to park and switch the call. Similarly, some dispatcher may use a handset rather than a headset. Relevant information on the CMS capabilities can be included in the information available to the ID address protocol module (3.040).

In a further embodiment, described with reference to FIGS. 3B and 5, the disclosure also supports the establishment of an E2E VF connection from the customer terminal (3.050) and associated network devices (3.030.3) to the redialer (3.060) over IP using proprietary signaling protocols. The customer terminal may be equipped with microphone and speaker (5.218.1, 5.218.2 in FIG. 5) to support VF interaction. When the customer terminal (3.050) initiates an E2E VF connection over IP, it sets up a connection (3.048) over the WAN (3.001) and optionally via the proprietary router (3.054) to the redialer (3.060) which terminates on the redialer's IP WAN interface (3.078.1). The resultant data stream is routed using the redialer bus (3.087) to the appropriate VoIP termination software task such as module 3.042 or 3.044 which extracts the identity of the customer terminal (3.050) or associated network devices (3.030.3) from the data stream and may re-sample the audio to use the same audio compression scheme as used on outgoing line 3.072. The audio data stream is passed on to the IP audio gateway (3.071) via the redialer bus (3.087) and from there to the call termination module (3.069).

A proprietary protocol having lower processing overheads can be used to establish the VoIP.

In another embodiment, the call to the redialer (3.060) by the customer terminal (3.050) or associated network devices (3.030.3) can be established over an IP network and use known voice-over-IP (VoIP) signaling protocols such as SIP (Session Initiation Protocol (see RFC 2543; RFC 3261)) via WAN (3.001.1) using a SIP server (3.098). Path 3.047 from customer terminal (3.050) to redialer (3.060) via WAN (3.001.1) illustrates such a connection. In this arrangement, the SIP server (3.098) is used to terminate SIP signaling for the VoIP call (3.047). The call enters the redialer (3.060) from WAN (3.001.1) and appears to the redialer to be the same as a call coming from the PSTN as described above. As the call 3.047 bypasses the PSTN (3.074), the media gateway (3.073) is not involved.

The incoming VoIP call using proprietary signaling (3.048) from the customer terminal (3.050) is parked (placed on hold) by the call termination module (3.069) which may play ring-tone or a message to the user at the customer terminal (3.050) while the call manager (3.065) uses information such as the source IP address of the data stream to identify the originating customer terminal (3.050) which is used to obtain the AEAE delivery details, including CMS phone number, customer account number and security format to use (e.g. ContactID, SIA or other) allowing the redialer to generate and deliver the AEAE to the CMS as described above.

When the call manager (3.065) receives the kissoff tone from the dialer receiver (3.076) at the CMS, it does not hang-up the call as when delivering an AE. Instead it connects the previously parked IP call from the customer terminal (3.050) through to the CMS. The media gateway (3.073) converts the incoming audio from the CMS to a digital signal thereby the joining of the two calls, call 1 from the customer terminal (3.050) and call 2 from the redialer (3.060) to the dialer receiver (3.076) is performed in the digital domain.

The resultant E2E VF path comprises the following:
the customer terminal (3.050)
A VoIP—IP data stream (3.048)
the WAN (3.001)
the proprietary router (3.054)
the WAN (3.001)
the redialer IP WAN interface (3.078.1)
the redialer IP protocol termination module (3.042)
the redialer IP audio gateway (3.071)
the redialer bus (3.087)
the call termination module in the redialer (3.069)
WAN interface (3.078.2)
the redialer outgoing POTS line (3.072)
the media gateway (3.073)
the PSTN (3.074)
the dialer receiver (3.076)
the dispatcher's headset (3.038)

As noted above network devices such as IP cameras, IP microphones, IP speakers, PCs and tablets can be used to generate E2E VF connections to, for example, the CMS.

Furthermore, an authorized telephone, fixed or mobile may also be used to place an alert call to the central station as long as its identification, which may be obtained from its caller ID, can be found in the common storage module (3.040). Where the redialer is configured with the caller ID of a mobile device, by establishing a phone call to the redialer (3.060) in an emergency situation, the user will be announced to the dispatcher as a valid customer by the AEAE preceding the connection of the audio. Furthermore, the redialer (3.060) may be programmed to precede the AEAE with a high importance AE, such as a personal duress alarm, in order to get the highest priority response at the CMS. The user's mobile device (3.029) having a wireless internet capability, may also have a designated emergency App which, in addition to setting up a call to the redialer (3.060), extracts the user's location coordinates from the mobile phones GPS subsystem and sends the coordinates via WAN (3.001) to the redialer (3.060) which forwards the coordinates to the AS (3.080) embedded in the duress alarm message sent by the redialer (3.060), as for example in the SIA alarm message text field. Thus the redialer can be configured to be utilized as an emergency reporting station.

A further embodiment will be described by way of example chiefly with reference to FIG. 3A. The IP microphone (3.030.3) may be triggered by the customer terminal (3.050), alarm event detectors, or other means to establish an audio streaming virtual connection over IP (3.049) to the redialer (3.060) via WAN 3.001 and proprietary router (3.054). The microphone can transmit via link 3.049 using VoIP. The format of the VoIP on link 3.049 may differ from that used on link 3.048.

The IP audio stream (3.049) terminates on the redialer's (3.060) IP WAN interface (3.078.1). Within the redialer the IP path is terminated by module (3.044) which extracts the customer terminal identifier and stores it in the redialer's memory (3.302). The data stream is routed to the IP audio gateway (3.071) which re-samples the audio if required. While SIP may be used for call establishment signaling, some network devices may not support it.

In this embodiment, if a video signal is associated with the audio from an IP camera, the video signal is generally not streamed unless enabled by the dispatcher for the purpose of using video as an additional alarm verification means. In this embodiment, the video streaming is assumed to be independent of the redialer.

The redialer bus (3.087) is used to connect the IP stream from the IP audio gateway (3.071) to the call termination module (3.069).

The incoming VoIP call from the network device (3.030.3) is placed on hold by the call termination module (3.069) while the generate VF link request module (3.066) uses the customer terminal ID information stored in the redialer's memory (3.302) to synthesize the AEAE message as described above, allowing the redialer to deliver the AEAE to the CMS as described above.

The resultant E2E VF path comprises the following:
the network device (3.030.3)
A VoIP—IP data stream (3.049)
the WAN (3.001)
the proprietary router (3.054)
the WAN (3.001)
the redialer IP WAN interface (3.078.1)
the redialer IP protocol termination module (3.044)
the redialer IP audio gateway (3.071)
the redialer bus (3.087)
the call termination module in the redialer (3.069)
WAN interface (3.078.2)

the redialer outgoing POTS line (3.072)
the media gateway (3.073)
the PSTN (3.074)
the dialer receiver (3.076)
the dispatcher's headset (3.038)

The association between the customer terminal (3.050) and CMS AS (3.080) is established as part of the provisioning process and may be entered using the communications management terminal (3.024) or other means, including Internet access. The data can be initially stored in the customer terminal (3.050) which then populates the redialer register (3.040) via the WAN (3.001) and the proprietary router (3.054). The information can include:

customer terminal (3.050) cellular phone number (caller ID)
    CMS dialer receiver (3.076) phone number
    redialer phone number (3.060)
    customer terminal (3.050) security service account identifier
    customer terminal (3.050) security service reporting format (ContactID, SIA etc.)

Some of the information, including the following may be entered during the customer terminal manufacturing stage:

customer terminal (3.050) cellular phone number (caller ID)
    redialer phone number (3.060)

Customer terminal (3.050) is associated with central station gateway (3.056). This association is managed by the communication management terminal (3.024) as is the association of customer terminal (3.050) with CMS AS (3.080).

The redialer handles alarm events (AE) and audio calls independently. The setting up of an audio link to the CMS is not triggered by an AE or an AEAE. The redialer sets up an audio link to the CMS on receipt of an audio call. The redialer also generates and sends an AEAE to the CMS AS (3.080) via the CMS dialer receiver (3.076) on receipt of an audio call, that is, the redialer (3.060) does not depend on the reception of an AEAE from the customer terminal (3.050) to trigger the establishment of an E2E VF connection between the CT (3.050) and the dispatcher (3.038).

FIG. 3B illustrates alternative arrangements via which the redialer can communicate with the automation system (3.080).

In one arrangement analog telephone adapter (ATA) (3.094) mediates communication between WAN (3.001.1) and dialer receiver (3.076). The ATA emulates the PSTN while eliminating the need to utilize the PSTN (3.074) between the redialer (3.060) and the automation system dialer receiver (3.076) and allows the call from the redialer (3.060) to be established over an IP WAN (3.001.1) alone.

In a further alternative arrangement, an IP PBX with dialer receiver functionality (3.096) can be used where the E2E communications between the redialer (3.060) and the CMS are carried out over an IP WAN (3.001.1). In this embodiment the PSTN (3.074) is eliminated as is the PSTN-based CMS dialer receiver (3.076) allowing the redialer (3.060) to communicate both AEs and audio using IP.

Also shown in FIG. 3B is a virtual switch (3.082), shown in dashed outline. This serves to illustrate the concept that, due to time separation, the VoIP signals are not connected to link 3.072 via the WAN interface (3.078.2) at the same time as the VF-AE or the VF-AEAE signal.

FIG. 4A describes the flow of actions associated with the customer terminal (4.050) delivering an AE to the CMS. In FIGS. 4A, 4B, and 4C, it is understood that signals transiting the media gateway (4.073) change from a digital format, such as VoIP to PSTN VF format, or from PSTN VF format to digital format, as the case requires. To assist with the interpretation of FIGS. 4A, 4B, and 4C, circuit switched calls, even when carried over a data packet network such as the internet, are shown using a solid line, whereas messages, such as customer terminal (4.050) originated AEs sent over a data packet network such as the internet are shown using a broken line.

The delivery of an AE by a customer terminal is often triggered by an external event, such as a sensor etc. This causes the customer terminal (4.050) to send an AE (4.100) via its data interface, which is connected to an IP network via a landline or cellular connection, to the proprietary router (4.054) using an IP tunnel. The proprietary router (4.054) forwards the AE message (4.101) via the IP WAN to the central station gateway (4.058). The central station gateway (4.058) identifies the destination CMS from the contents of the AE message (4.101) and routes the AE message (4.102) to the redialer (4.060).

After receiving the message (4.102) from the central station gateway (4.058), the redialer (4.060) may send an acknowledgment message (4.104) to the central station gateway (4.058) which causes the central station gateway (4.058) to send an acknowledgment message (4.105) to the proprietary router (4.054), which forwards the acknowledgment message (4.106) to the customer terminal (4.050).

In addition, the redialer (4.060) places a VoIP call to the CMS dialer receiver (4.076) using the phone number in the AE message (4.102) received from the central station gateway (4.058). The VoIP call is placed via the media gateway (4.073) and involves call setup instructions (4.108) to the media gateway (4.073). The media gateway converts the VoIP instructions to PSTN VF signaling format and causes a call (4.109) to be placed via the PSTN (4.074) to the CMS dialer receiver (4.076). The dialer receiver (4.076) answers the call and sends out handshake tones (4.110) which are delivered via the media gateway (4.073), converted to VoIP format, and received by the redialer over VoIP (4.111).

The redialer (4.060) then sends the audio encoded AE (4.112) over the media gateway (4.073) where the AE (4.113) is sent over the PSTN (4.074) to the dialer receiver (4.076).

The dialer receiver (4.076) decodes the AE message (4.114) and sends it in digital format to the AS (4.080), which acknowledges the message (4.115) to the dialer receiver (4.076).

The dialer receiver (4.076) sends a kissoff tone (4.116) over the PSTN (4.074) to the redialer (4.060) to acknowledge the reception of the AE. The kissoff tone (4.116) is sent via the media gateway (4.073) to the redialer (4.060) where it is received (4.117) as VoIP.

On receiving the kissoff message (4.117), the redialer (4.060) sends an acknowledgment data message (4.118) to the central station gateway (4.058) which causes the central station gateway (4.058) to send an acknowledgment data message (4.119) to the proprietary router (4.054), which forwards the acknowledgment data message (4.099) to the customer terminal (4.050).

FIG. 4B describes the flow of actions associated with a cellular connected customer terminal (4.050) establishing an E2E VF connection to the CMS.

There are various triggers that cause the customer terminal (4.050) to establish an E2E VF connection to the CMS, including situations where the person in the monitored premises is feeling vulnerable and frightened and wants to have someone to talk to while the police are on their way to the premises. In that case the person will press the duress button on the alarm system (2.051) which will cause the customer terminal (4.050) to setup a cellular call (4.120) via the cellular network (4.064) to the redialer (4.060). The cellular call (4.120) exists the cellular network (4.064) and connects (4.122) to the redialer (4.060) via the PSTN (4.074) and media gateway (4.073).

As described above, the redialer (4.060) may use the caller ID of the incoming call to look up the phone number of the destination CMS dialer receiver (4.076). The redialer (4.060) places a VoIP call (4.124) via the media gateway (4.073) which forwards it in PSTN VF format (4.126) to the CMS dialer receiver (4.076). The call (4.126) enters the dialer receiver (4.076) via the PSTN (4.074) and causes the phone line to ring. The CMS dialer receiver (4.076) answers the call and sends out the handshake tones (4.130) indicating to the redialer (4.060) that it is ready to receive the AE. The media gateway (4.073) converts the VF to IP and presents the handshake (4.132) to the redialer (4.060). The redialer delivers the synthesized AEAE (4.134) as described above, via the media gateway (4.073), over the PSTN (4.074) to where AEAE in 4.136 analog form is received by the dialer receiver (4.076). The dialer receiver (4.076) decodes the AEAE (4.138) and sends it to the AS (4.080) to be displayed to the dispatcher. The AS (4.080) in turn sends an acknowledgement message (4.142) to the dialer receiver (4.076).

The dialer receiver (4.076) sends a kissoff message (4.144) to the redialer (4.060) which is converted by the media gateway (4.073) to VoIP (4.146).

Now that that the dialer receiver (4.076) has been alerted that the E2E VF connection is about to be set up, the redialer call termination (3.069) module connects (4.150) the cellular call from the customer terminal (4.120) with the call (4.124/4.126) to the dialer receiver (4.076) generating the E2E VF connection (4.149).

Once the E2E VF connection (4.149) is established, the dispatcher can use a telephone keypad or the AS (4.080) interface to control the call and the customer terminal (4.050) by sending DTMF tones in the direction of the customer terminal (4.050). For example, pressing '1' will turn on the customer terminal (4.050) speaker allowing remote announcements to be made; pressing '2' will increase the sensitivity and pressing '*' will cause the customer terminal (4.050) to hang up the call. While it is possible to deliver the DTMF tones through to the customer terminal (4.050) via the VF call path (4.149), in the preferred embodiment the call manager (3.065) detects the DTMF digits and delivers them to the customer terminal (4.050) as messages (4.168, 4.170 and 4.172) over IP WAN interface (3.078.1) and the WAN (3.001) following the AE delivery path in reverse. This is illustrated in FIG. 4B—The operator (4.080) presses a keypad button that causes DTMF tones (4.160) to be sent towards the customer terminal (4.050). The tones (4.162) are coupled into the PSTN (4.074) using the dialer receiver (4.076)—note that as detailed above, a PBX may also be used. The media gateway (4.073) converts the tones to VoIP format (4.164) and delivers them to the redialer (4.060). The redialer (4.060) detects the tones and converts them to a data message (4.168), which is sent to the central station gateway (4.058) which forwards the message (4.170) to the proprietary router (4.054). The proprietary router (4.054) forwards the control message (4.172) to the customer terminal (4.050) via VoIP link (see 3.048 in FIG. 3). While the DTMF tones are received by the customer terminal (3.050) (4.050) over the E2E VF connection (3.046) (4.178), if the customer terminal speaker (3.218.2) is enabled, they may be heard as background "tweets" by a person at the customer terminal end. The customer terminal can ignore these signals on the E2E VF connection and only act on the control message that has been sent to the customer terminal via the data link (03.053) by the redialer (4.060).

The redialer (4.060) and the customer terminal (4.050) may hang up the call after timing out, or on receiving a command as part of the call control implementation. The redialer (4.060) which instructs (4.180) the media gateway (4.073) to clear down the PSTN call (4.182) which would cause the PSTN (4.074) to signal to the dialer receiver (4.076) that the other party—the redialer (4.060) has hung-up the call, causing the dialer receiver (4.076) to hang up. It would be clear to one skilled in the art that there are numerous ways to clear down the E2E VF link, the particular implementation chosen is not critical to embodiments.

FIG. 4C describes the flow of actions associated with a customer terminal (4.050) establishing an E2E VF connection to the CMS using a voice-over-IP (VoIP) over an IP communication path. Note that this figure also applies to the voice-over-IP being generated by a network device associated with the customer terminal such as an IP microphone (2.030.3) or tablet (2.031).

The process starts with a trigger event which causes the customer terminal (4.050) to initiate a VoIP call (4.123) via the internet (3.001) and the proprietary router (4.054) to the redialer (4.060).

As described above, the redialer (4.060) uses the source IP address of the VoIP data stream or other information that uniquely identifies the customer terminal (4.050) to look up the phone number of the destination CMS dialer receiver (4.076). The redialer (4.060) places a VoIP call (4.124) via the media gateway (4.073) which converts the call to PSTN format (4.126) and forwards it to the CMS dialer receiver (4.076). The call (4.126) enters the dialer receiver (4.076) via the PSTN and causes the phone line to ring. The CMS dialer receiver (4.076) answers the call and sends out the handshake tones (4.130) indicating to the redialer (4.060) that it is ready to receive the AE. The media gateway (4.073) converts the VF to IP and presents the handshake (4.132) to the redialer (4.060). The redialer delivers the synthesized AEAE (4.134) as described above, over the media gateway (4.073), over the PSTN (4.136) to the dialer receiver (4.076). The dialer receiver (4.076) decodes the AEAE (4.138) and sends it to the AS (4.080) to be displayed to the dispatcher. The AS (4.080) in turn sends an acknowledgement message (4.142) to the dialer receiver (4.076).

The dialer receiver (4.076) sends a kissoff message (4.144) to the redialer (4.060) which is converted by the media gateway (4.073) to VoIP (4.146).

Now that that the dialer receiver (4.076) has been alerted that the E2E VF connection is about to be set up, the redialer connects (4.150) the voice-over-IP call from the customer terminal (4.125) with the call (4.124/4.126) to the dialer receiver (4.076) generating the E2E VF connection (4.149).

Once the E2E VF connection (4.149) is established, the dispatcher can use a telephone keypad or the AS (4.080) interface to control the call and the customer terminal (4.050) by sending DTMF tones in the direction of the customer terminal (4.050). For example, pressing '1' will turn on the customer terminal (4.050) speaker allowing remote announcements to be made; pressing '2' will increase the sensitivity and pressing '*' will cause the customer terminal (4.050) to hang up the call. While it is possible to deliver the DTMF tones through to the customer terminal (4.050) via the VF path (4.149), in the preferred embodiment the call manager (3.065) detects the DTMF digits and delivers them to the customer terminal (4.050) as messages (4.168, 4.170 and 4.172) over the data network. This is illustrated in FIG. 4C—The operator (4.080) presses a keypad button that causes DTMF tones (4.160) to be sent towards the customer terminal (4.050). The tones (4.162) are coupled into the PSTN (4.074) using the dialer receiver (4.076)—note that as detailed above, a PBX may also be used. The media gateway (4.073) converts the tones to VoIP format (4.164) and delivers them to the redialer (4.060). The redialer (4.060) detects the tones and converts them to a data message (4.168), which is sent to the central station gateway (4.058) which forwards the message (4.170) to the proprietary router (4.054). The proprietary router (4.054) forwards the control message (4.172) to the customer terminal (4.050). While the DTMF tones are received by the customer terminal (4.050) over the E2E VF connection (4.178), the detection is implemented by the redialer (4.060).

The redialer (4.060) and the customer terminal (4.050) may hang up the call after timing out, or on receiving a command as part of the call control implementation. The redialer (4.060) which instructs (4.180) the media gateway (4.073) to clear down the PSTN call (4.182) which would cause the PSTN (4.074) to signal to the dialer receiver (4.076) that the other party—the redialer (4.060) has hung-up the call, causing the dialer receiver (4.076) to hang up. It would be clear to one skilled in the art that there are numerous ways to clear down the E2E VF link, the particular implementation chosen is not critical to the embodiments.

FIG. 5 illustrates functional features of a customer terminal 5.050 according to an embodiment.

The customer terminal includes a processor 5.200 with associated memory 5.203 and FLASH memory 5.202.

Functional elements include:
A control interface 5.212 which can be adapted to control home automation
devices or peripherals;
Display interface 5.216;
IP network interface 5.214; cellular network interface 5.208;
Alarm sensor interface 5.206;
Audio interface 5.210 with associated audio transducers (5.218) such as microphone 5.218.1 and speaker 5.218.2;
WiFi WLAN interface 5.220; Z-Wave interface 5.222 as an example of an interface to wireless home automation devices;
Video/audio interface 5.224.
Bus 5.204 illustrates functional connection between the functional elements and the processor 5.200.
User interface by way of a keypad 5.201

FIG. 6 illustrates functional features of the redialer 6.060.

Processor 6.300 is configured to control a number of functions including, by way of example:
Call Manager 6.065;
Voice Link request generator 6.066;
Data to VF Data Converter 6.067;
Call Termination 6.069
IP Audio gateway 6.071;
Call joiner 6.074
BIOS memory 6.301;
Memory 6.302.

Operative connection between these functions and processor 6.300 is illustrated as bus 6.303.

The memory 6.302 can include a lookup table 6.304 which associates customer terminal with corresponding CMS AS (3.080) and stores the digital samples associated with the AE analog waveform as disclosed above.

FIG. 7 details the steps associated with the customer terminal (3.050) sending an AE to the CMS AS (3.080).

Step 7.702—the customer terminal (3.050) sends an AE to the redialer (3.060). The AE is sent via the WAN using a cellular or landline IP connection and transits the proprietary router (3.054) and central station gateway (3.056).

Step 7.704—on receiving the AE, the redialer (3.060) identifies the destination CMS and converts the AE received over the WAN (3.001) to a form which is compatible for transmission over a limited bandwidth network such as the PSTN (3.074).

Step 7.705—the redialer (3.060) sets up a call (call 1) over VoIP to the PSTN (3.074) through to the dialer receiver (3.076).

Step 7.706—on detecting the incoming PSTN (3.074) call, the dialer receiver (3.076) sends a handshake signal to the redialer (3.060).

Step 7.707—on detecting the handshake signal, the redialer (3.060) sends the AE as VF data over the PSTN (3.074) connection to the dialer receiver (3.076).

The process divides into two paths after Step 7.707. One path details the parallel activity at the CMS dialer receiver (3.076) and AS (3.080) and second path details the parallel operation of the redialer.

The process via Step 7.09 is set out first.

Step 7.709—the redialer (3.060) detects the kissoff tone from the dialer receiver (3.076)

Step 7.712—the redialer (3.060) sends an acknowledge message to the customer terminal (3.050) indicating that the AE was delivered to the CMS AS (3.080).

Step 7.710—as the redialer (3.060) has no more AE's to send, it drops the call (call 1) to the dialer receiver (3.076) and the process concludes with the redialer (3.060) terminating call 1.

Optional Step 7.714—optionally the redialer (3.060) waits time T1 seconds before dropping call 1 in case the customer terminal (3.050) will send another AE, or the customer terminal (3.050) will establish a voice call (call 2)—using cellular or VoIP—with the redialer (3.060) which will require the use of call 1—this reduces call costs and setup times Optional step 7.716—if the redialer (3.060) does not receive an AE or a call from the customer terminal (3.050) within time T seconds, it will drop call 1.

Optional Step 7.718—if another AE is received within the time window, go to Step 7.707.

Optional Step 7.720—if a call (call 2) is received from the customer terminal (3.050) within the time window (cellular or IP), go to FIG. 8.

Otherwise, the process concludes.

The path via Step 7.708 is set out below.

Step 7.708—the dialer receiver (3.076) sends a kissoff signal to the redialer (3.060) indicating that the AE has been correctly received Step 7.722—on receipt of VFAE from the redialer (3.060), the dialer receiver (3.076) converts the VFAE to a format suitable for delivery to the AS (3.080)

Step 7.724—dialer receiver forwards the converted AE to the AS (3.080)

Step 7.726—the AS (3.080) confirms receipt of the converted AE to the dialer receiver, and the process can terminate with the dialer receiver (3.076) hanging up the call if a new AE is not received from the redialer (3.060) within time T2 seconds.

FIG. 8 details the steps associated with the establishment of an E2E VF path between the customer terminal (3.050) and the CMS dispatcher, represented by the headset (3.038).

Step 8.802—the customer terminal (3.050) establishes a call (call 2) to the redialer (3.060) over VoIP or cellular.

Step 8.803—the redialer (3.060) obtains customer terminal ID from the incoming call and uses that to look up details of associated CMS.

Step 8.804—the redialer (3.060) sets up a call (call 3) over VoIP to the PSTN (3.074) to the dialer receiver (3.076).

Step 8.806—the redialer (3.060) synthesizes a voice link request AEAE to the CMS based on the ID of the requesting customer terminal (3.050) and generates a set of data samples to create the appropriate audio data signal on the PSTN.

Step 8.808—on detecting the incoming PSTN (3.074) call, the dialer receiver (3.076) answers the call and sends a handshake signal to the redialer (3.060).

Step 8.810—on receipt of the handshake, the redialer (3.060) streams the samples associated with the synthesized AEAE over the PSTN (3.074) connection to the dialer receiver (3.076).

The process splits into two paths—a first path via Step 8.816, and a second path via Step 8.811

Step 8.816—the dialer receiver (3.076) sends a kissoff signal to the redialer (3.060) indicating that the AEAE has been correctly received.

Step 8.812—the dialer receiver (3.076) sends the AEAE to the AS (3.080)

Step 8.814—the AS acknowledges the voice link request AEAE to the dialer receiver (3.076)

On the second path,

Step 8.811—the redialer (3.060), detects the kissoff tone from the dialer receiver indicating that the AEAE was correctly received Step 8.818—the redialer (3.060), in response to the detected need for a VF link by the customer terminal (3.050), and having received the kissoff from the dialer receiver, the redialer (3.060) joins call 2 and call 3 thereby creating an E2E VF path from the customer terminal (3.050) through to the AS (3.080).

The process paths merge after Steps 8.814 and 8.818.

Steps 8.820 to 8.834 enable the dispatcher to send VF commands to control the customer terminal (3.050) at the customer premises.

Step 8.820—the dispatcher determines if adjustment of the VF signal, for example volume control, is required.

Step 8.822—the dispatcher at AS (3.080) sends a control command to the customer terminal via the redialer.

Step 8.824—the redialer converts the control command to a format for transmission via a data network.

Step 8.826—the redialer sends the control command in data format to the customer terminal.

Step 8.828—the customer terminal implements the control command or forwards it to the microphone control to adjust the volume.

Step 8.830—the call continues.

Step 8.834—determines when the call is complete and the call is terminated on completion (clear down call 2 and clear down call 3).

The invention claimed is:

1. A method of establishing a communication path between a first terminal and a second terminal, the method comprising:
   receiving a first call from the first terminal;
   answering the first call;
   generating a call establishment request (CER);
   establishing a second call to the second terminal;
   forwarding the CER to the second terminal;
   receiving an acknowledgement from the second terminal;
   connecting the first call and the second call;
   wherein the first call is in a first protocol and the second call is in a second protocol, the method including converting the first call and the second call to an intermediate protocol before connecting the first call and the second call, the first protocol being a data format and the second protocol being a voice frequency format.

2. A method of establishing a communication path as claimed in claim 1, further comprising placing the first call on hold until the acknowledgement is received.

3. A method of establishing a communication path as claimed in claim 1, further comprising converting the second call in the intermediate protocol to the first protocol for transmission to the first terminal and converting the first call in the intermediate protocol to the second protocol for transmission to the second terminal.

4. A method of establishing a communication path between a first and a second terminal as claimed in claim 1, the first terminal being a mobile device having location capability, the method including sending a location message derived from the location capability to the second terminal via a redialer.

5. A method of establishing a communication path between a first and a second terminal as claimed in claim 1, further comprising:
   receiving voice frequency (VF) data information using a first external protocol from either the first or second terminal;
   converting the VF data information to a data message format;
   and forwarding the data message via an IP interface to the other of the first or second terminals.

6. A redialer adapted to receive a first call from a first terminal, answer the first call, generate a call establishment request message, establish a second call to a second terminal and forward the call establishment request message (CERM) to the second terminal and connect the first call and the second call after receiving an acknowledgement from the second terminal to the CERM;
   wherein the first call is in a first protocol and the second call is in a second protocol, the redialer adapted to convert the first call and the second call to an intermediate protocol before connecting the first and second calls, the first protocol being a data format and the second protocol being a voice frequency format.

7. A redialer as claimed in claim 6, further comprising:
   at least one network interface;
   a call manager processor;
   a call detector;
   call termination capability adapted to answer a first call;
   a call establishment request generator (CERG);
   wherein the call manger processor is adapted to;
   (a) cause the first call to be answered using the call termination capability;
   (b) cause the CERG to generate the CERM;
   (c) establish the second call to the second terminal;
   (c) forward the CERM to the second terminal;
   (d) receive the acknowledgement to the CERM from the second terminal;
   (e) connect the first and second calls.

8. A redialer as claimed in claim 6, further comprising at least one communication path interface adapted to receive calls in at least one of the first protocol and the second protocol and to convert the first call and the second call to a redialer internal protocol, and to convert outgoing calls from the redialer internal protocol to at least one of the first protocol and the second protocol.

9. A redialer as claimed in claim 8, further comprising at least two network interfaces;
   wherein each interface is adapted to facilitate communications using the first protocol and the second protocol.

10. A redialer as claimed in claim 9, wherein at least one of the network interfaces is an IP interface.

11. A redialer as claimed in claim 7, further comprising a call termination, and wherein the first call is placed on hold on being answered.

12. A communication system adapted to establish a communication path between a first terminal and a second terminal, the system comprising:
   a network based redialer as claimed in claim 6;
   wherein the first terminal includes a first communication interface adapted to establish a first communication path with the redialer via at least a first communication network.

13. A communication system as claimed in claim 12, wherein the network includes a protocol converter adapted to convert calls between the incoming protocol and a second terminal protocol.

14. A mobile device including location capability, the mobile device being adapted to transmit, in response to user activation, a first message to a second terminal via a redialer as claimed in claim 6, the mobile device being adapted to automatically transmit a location message to the redialer.

* * * * *